(12) United States Patent
Hsu et al.

(10) Patent No.: US 9,759,892 B2
(45) Date of Patent: Sep. 12, 2017

(54) IMAGING OPTICAL LENS ASSEMBLY, IMAGE CAPTURING APPARATUS AND ELECTRONIC DEVICE

(71) Applicant: LARGAN PRECISION CO., LTD., Taichung (TW)

(72) Inventors: Chih-Wen Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/991,414

(22) Filed: Jan. 8, 2016

(65) Prior Publication Data
US 2017/0146774 A1  May 25, 2017

(30) Foreign Application Priority Data

Nov. 20, 2015  (TW) .............................. 104138499 A

(51) Int. Cl.
G02B 3/02 (2006.01)
G02B 13/00 (2006.01)
G02B 1/04 (2006.01)
G02B 9/60 (2006.01)

(52) U.S. Cl.
CPC ......... *G02B 13/0045* (2013.01); *G02B 1/041* (2013.01); *G02B 9/60* (2013.01)

(58) Field of Classification Search
CPC .................................................. G02B 13/0045
USPC ....................................................... 359/714
See application file for complete search history.

(56) References Cited

U.S. PATENT DOCUMENTS

| 5,774,279 | A | 6/1998 | Kiriki et al. |
| 7,480,105 | B2 | 1/2009 | Mori |
| 7,639,432 | B2 | 12/2009 | Asami |
| 7,821,720 | B2 | 10/2010 | Wang et al. |
| 8,164,834 | B2 | 4/2012 | Miyano |
| 8,422,150 | B2 * | 4/2013 | Takato ............... G02B 13/0045 359/715 |
| 8,654,242 | B2 | 2/2014 | Matsusaka et al. |
| 8,724,230 | B2 | 5/2014 | Morita |

FOREIGN PATENT DOCUMENTS

| JP | 2007-279282 A | 10/2007 |
| JP | 2009-109576 A | 5/2009 |
| JP | 2010-276923 A | 12/2010 |
| JP | 2012-103717 A | 5/2012 |
| JP | 2012-230434 A | 11/2012 |
| JP | 2013-025202 A | 2/2013 |

* cited by examiner

*Primary Examiner* — James Jones
(74) *Attorney, Agent, or Firm* — McClure, Qualey & Rodack, LLP

(57) ABSTRACT

An imaging optical lens assembly includes, in order from an object side to an image side, a first lens element, a second lens element, a third lens element, a fourth lens element and a fifth lens element. The first lens element with negative refractive power has an image-side surface being concave. The second lens element has an object-side surface being concave and an image-side surface being convex. The third lens element has an object-side surface being concave and an image-side surface being convex. The fourth lens element with positive refractive power has an image-side surface being convex. The fifth lens element with negative refractive power has an object-side surface being concave.

20 Claims, 19 Drawing Sheets

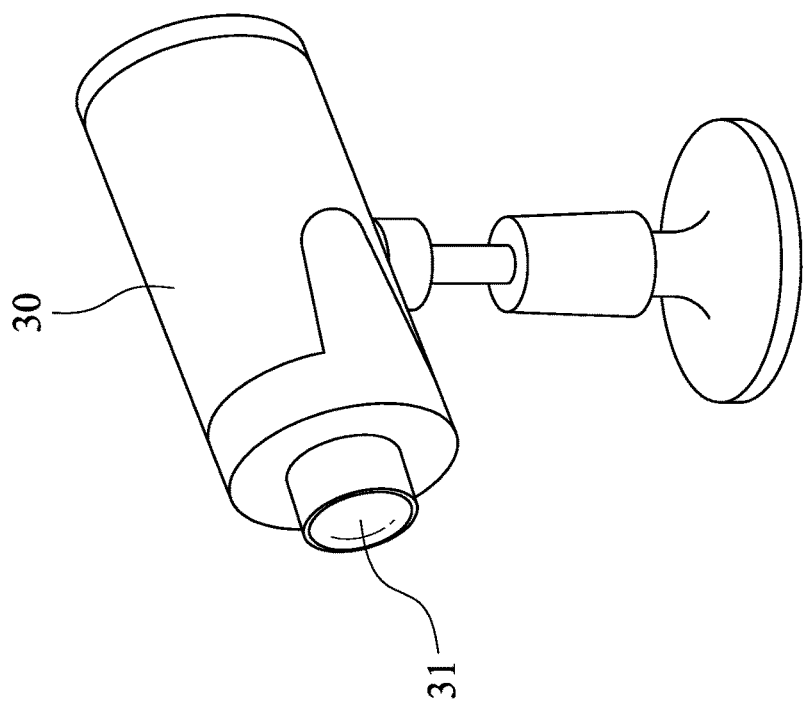

IMAGING OPTICAL LENS ASSEMBLY, IMAGE CAPTURING APPARATUS AND ELECTRONIC DEVICE

RELATED APPLICATIONS

This application claims priority to Taiwan Application Serial Number 104138499, filed Nov. 20, 2015, which is herein incorporated by reference.

BACKGROUND

Technical Field

The present disclosure relates to an imaging optical lens assembly and an image capturing apparatus. More particularly, the present disclosure relates to a compact wide-angle imaging optical lens assembly and an image capturing apparatus which is applicable to electronic devices.

Description of Related Art

In recent years, with the popularity of mobile terminals having camera functionalities, the demand of miniaturized optical systems has been increasing. The sensor of a conventional optical system is typically a CCD (Charge-Coupled Device) or CMOS (Complementary Metal-Oxide-Semiconductor) sensor. As the advanced semiconductor manufacturing technologies have reduced the pixel size of sensors and compact optical systems have gradually evolved toward the field of higher megapixels, there is an increasing demand for compact optical systems featuring better image quality.

With the growing popularity of wide-angle lenses, as well as the increasing applications utilizing these wide-angle lenses, many products have been equipped with wide-angle lenses so as to be applied in the fields such as image assistances, image recognitions and image recordings. Hence, the specifications of wide-angle lenses have become more demanding to satisfy the requirements of large field of view, large aperture, compact size, high resolution and resistance to environmental changes simultaneously. For example, in order to allow the driver to easily see the obstacles behind the vehicle while in reverse, a wide-angle lens shall be equipped to provide the features of a large field of view, the low light photographing capability, the resistance against different environmental effects (cold and hot), and compact size to maintain the aesthetic appearance of the vehicle. Furthermore, the wide-angle lenses are also applied in driving recorders, extreme sports cameras and network surveillance devices, and the wide-angle lenses in these devices must provide the features of large field of view, large aperture, compact size, high resolution and resistance to environmental changes.

However, the conventional wide-angle lenses cannot satisfy the requirements in extreme conditions as previously mentioned, so there is an urgent need in developing a wide-angle lens with the features of large field of view, large aperture, compact size, high resolution and resistance to environmental changes.

SUMMARY

According to one aspect of the present disclosure, an imaging optical lens assembly includes, in order from an object side to an image side, a first lens element, a second lens element, a third lens element, a fourth lens element and a fifth lens element. The first lens element with negative refractive power has an image-side surface being concave. The second lens element has an object-side surface being concave and an image-side surface being convex. The third lens element has an object-side surface being concave and an image-side surface being convex. The fourth lens element with positive refractive power has an image-side surface being convex. The fifth lens element with negative refractive power has an object-side surface being concave. The imaging optical lens assembly has a total of five lens elements. When a central thickness of the second lens element is CT2, a central thickness of the third lens element is CT3, a focal length of the first lens element is f1, a focal length of the fourth lens element is f4, an axial distance between the first lens element and the second lens element is T12, and an axial distance between the third lens element and the fourth lens element is T34, the following conditions are satisfied:

$1.20 < CT2/CT3$;
$|f1/f4| < 10.0$; and
$T12/T34 < 3.50$.

According to another aspect of the present disclosure, an image capturing apparatus includes the imaging optical lens assembly according to the aforementioned aspect and an image sensor, wherein the image sensor is disposed on an image surface of the imaging optical lens assembly.

According to another aspect of the present disclosure, an electronic device includes the image capturing apparatus according to the foregoing aspect.

BRIEF DESCRIPTION OF THE DRAWINGS

FIG. 19 shows an electronic device according to the 11th embodiment of the present disclosure.

DETAILED DESCRIPTION

Figure 1:
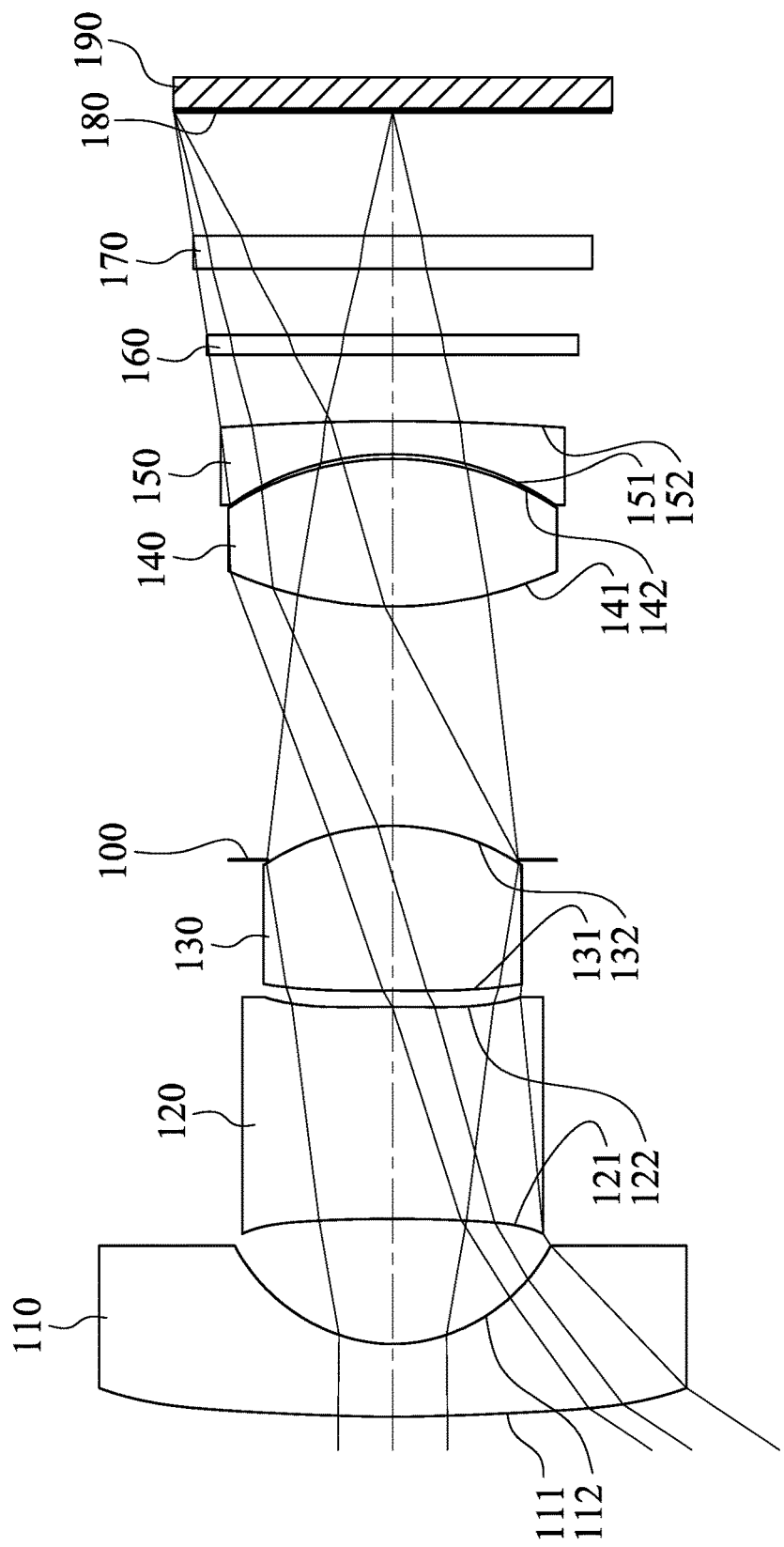
FIG. 1 is a schematic view of an image capturing apparatus according to the 1st embodiment of the present disclosure.

An imaging optical lens assembly includes, in order from an object side to an image side, a first lens element, a second lens element, a third lens element, a fourth lens element and a fifth lens element. The imaging optical lens assembly has a total of five lens elements.

The imaging optical lens assembly can further include an aperture stop, wherein the lens elements disposed between an imaged object and the aperture stop are defined as a front lens group, and the lens elements disposed between the aperture stop and an image surface are defined as a rear lens group.

The first lens element with negative refractive power has an image-side surface being concave. Therefore, it is favorable for providing the imaging optical lens assembly with a large field of view.

The second lens element has an object-side surface being concave and an image-side surface being convex. Therefore, it is favorable for effectively correcting aberrations, particularly aberrations generated from the light with a large view angle.

The third lens element has an object-side surface being concave and an image-side surface being convex. Therefore, it is favorable for further effectively correcting aberrations generated from the light with a large view angle.

The fourth lens element with positive refractive power can have an object-side surface being convex and has an image-side surface being convex. Therefore, it is favorable for converging the incident light of the imaging optical lens assembly on the image surface.

The fifth lens element with negative refractive power has an object-side surface being concave and can have an image-side surface being convex. Therefore, it is favorable for reducing chromatic aberration and suppressing the angle of the incident light in the off-axial region with a large aperture.

At least one of the second lens element and the third lens element can include at least one inflection point. Therefore, it is favorable for effectively correcting the off-axial aberrations so as to improve the image quality in the off-axial region.

The aperture stop can be disposed between the third lens element and the fourth lens element. Therefore, it is favorable for disposing the aperture stop at a proper position in the imaging optical lens assembly, so as to avoid the insufficient incident light entering the imaging optical lens assembly while the aperture stop is excessively near the object side, or the incident angle of the principal light in the off-axial region being too large while the aperture stop is excessively near the image side.

When a central thickness of the second lens element is CT2, and a central thickness of the third lens element is CT3, the following condition is satisfied: $1.20 < CT2/CT3$. Therefore, it is favorable for balancing the image quality and the photosensitivity, particularly the photosensitivity to environmental effects. Preferably, the following condition is satisfied: $2.0 < CT2/CT3 < 8.0$. More preferably, the following condition is satisfied: $2.40 < CT2/CT3 < 5.0$.

When a focal length of the first lens element is f1, and a focal length of the fourth lens element is f4, the following condition is satisfied: $|f1/f4| < 10.0$. Therefore, it is favorable for enlarging the field of view and obtaining a proper arrangement of refractive power for maintaining the compact size. Preferably, the following condition is satisfied: $|f1/f4| < 2.50$.

When an axial distance between the first lens element and the second lens element is T12, and an axial distance between the third lens element and the fourth lens element is T34, the following condition is satisfied: $T12/T34 < 3.50$. Therefore, it is favorable for suppressing the angle of the incident light in the off-axial region with a large aperture so as to increase the resolution and the luminance. Preferably, the following condition is satisfied: $0.30 < T12/T34 < 2.0$.

When the axial distance between the first lens element and the second lens element is T12, and an axial distance between the second lens element and the third lens element is T23, the following condition is satisfied: $1.25 < T12/T23 < 5.0$. Therefore, it is favorable for assembling the lens elements, effectively reducing the total track length and maintaining the compact size.

When a maximal effective radius of an object-side surface of the first lens element is Y11, and a maximal image height of the imaging optical lens assembly is ImgH, the following condition is satisfied: $0.90 < Y11/ImgH < 1.60$. Therefore, it is favorable for suppressing the image size difference between the front lens group and the rear lens group so as to minimize the imaging optical lens assembly.

When a focal length of the second lens element is f2, a focal length of the third lens element is f3, the focal length of the fourth lens element is f4, and a focal length of the fifth lens element is f5, the following condition is satisfied: $0.60 < |f4/f2| + |f4/f3| + |f4/f5| < 1.50$. Therefore, it is favorable for suppressing the change of refractive power among the lens elements so as to avoid the insufficient or excessive aberration corrections and to reduce the photosensitivity.

When an Abbe number of the second lens element is V2, the following condition is satisfied: $V2 < 30$. Therefore, it is favorable for effectively correcting chromatic aberration.

When a maximal field of view of the imaging optical lens assembly is FOV, the following condition is satisfied: $100$ degrees $< FOV$. Therefore, it is favorable for obtaining a larger field of view and a wider imaging scene of the imaging optical lens assembly.

When a focal length of the imaging optical lens assembly is f, the focal length of the first lens element is f1, the focal length of the second lens element is f2, the focal length of the third lens element is f3, the focal length of the fourth lens element is f4, and the focal length of the fifth lens element is f5, the following conditions are satisfied: $|f/f1| < 1.25$; $|f/f2| < 1.25$; $|f/f3| < 1.25$; $|f/f4| < 1.25$; and $|f/f5| < 1.25$. Therefore, it is favorable for avoiding the excessive difference of refractive power among the lens elements so as to further suppress the light refraction and reduce ghost images.

When a curvature radius of an object-side surface of the fourth lens element is R7, and a curvature radius of the image-side surface of the fourth lens element is R8, the following condition is satisfied: $0.0 < (R7+R8)/(R7-R8) < 1.0$.

Therefore, it is favorable for reducing aberrations of the fourth lens element with large refractive power.

When the focal length of the imaging optical lens assembly is f, and a composite focal length of the first lens element, the second lens element and the third lens element is f123, the following condition is satisfied: 0<f/f123. Therefore, it is favorable for reducing the back focal length by positive refractive power of the front lens group so as to further reduce the size of the imaging optical lens assembly.

When the focal length of the imaging optical lens assembly is f, a curvature radius of the object-side surface of the third lens element is R5, and a curvature radius of the image-side surface of the third lens element is R6, the following condition is satisfied: −1.5<(f/R5)+(f/R6)<−0.60. Therefore, it is favorable for correcting aberrations by the third lens element and obtaining the surface shapes suitable for manufacturing.

In the front lens group, at least one lens element thereof such as the first lens element can be made of a glass material so as to reduce the environmental effects, or at least lens element thereof can be made of a plastic material and can have an aspheric surface so as to correct aberrations.

According to the imaging optical lens assembly of the present disclosure, the lens elements thereof can be made of plastic or glass materials. When the lens elements are made of plastic materials, the manufacturing cost can be effectively reduced. When the lens elements are made of glass materials, the arrangement of the refractive power of the imaging optical lens assembly may be more flexible to design. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the imaging optical lens assembly can also be reduced.

According to the imaging optical lens assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the imaging optical lens assembly of the present disclosure, the refractive power or the focal length of a lens element being positive or negative may refer to the refractive power or the focal length in a paraxial region of the lens element.

According to the imaging optical lens assembly of the present disclosure, the imaging optical lens assembly can include at least one stop, such as an aperture stop, a glare stop or a field stop. The glare stop or the field stop is for eliminating the stray light and thereby improving the image resolution thereof.

According to the imaging optical lens assembly of the present disclosure, the image surface, depending on the corresponding image sensor, can be a planar surface or a curved surface with any curvature, particularly a curved surface being concave toward the object side.

According to the imaging optical lens assembly of the present disclosure, an aperture stop can be configured as a front stop or a middle stop. A front stop disposed between an imaged object and the first lens element can provide a longer distance between an exit pupil of the imaging optical lens assembly and the image surface to enable a telecentric effect, and thereby can improve the image-sensing efficiency of an image sensor. A middle stop disposed between the first lens element and the image surface is favorable for enlarging the field of view of the imaging optical lens assembly and thereby provides a wider field of view for the same.

According to the imaging optical lens assembly of the present disclosure, the imaging optical lens assembly can be optionally applied to moving focus optical systems. Furthermore, the imaging optical lens assembly is featured with a good correction ability and high image quality, and can be applied to 3D (three-dimensional) image capturing applications, in products such as digital cameras, mobile devices, digital tablets, smart TVs, network surveillance devices, motion sensing input devices, driving recorders, rear view camera systems, extreme sports cameras, industrial robots, wearable devices and other electronic imaging products.

According to the present disclosure, an image capturing apparatus is provided. The image capturing apparatus includes the aforementioned imaging optical lens assembly according to the present disclosure and an image sensor, wherein the image sensor is disposed on or near an image surface of the aforementioned imaging optical lens assembly. In the imaging optical lens assembly of the image capturing apparatus, it is favorable for obtaining the features of large field of view, large aperture, compact size, high resolution and resistance to environmental changes by the proper arrangement of refractive power, surface shape, central thickness, focal length and axial distance of the imaging optical lens assembly. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for obtaining the features of large field of view and high resolution. Preferably, the electronic device can further include but not limited to a control unit, a display, a storage unit, a random access memory unit (RAM) or a combination thereof.

According to the above description of the present disclosure, the following 1st-11th specific embodiments are provided for further explanation.

1st Embodiment

Figure 2:
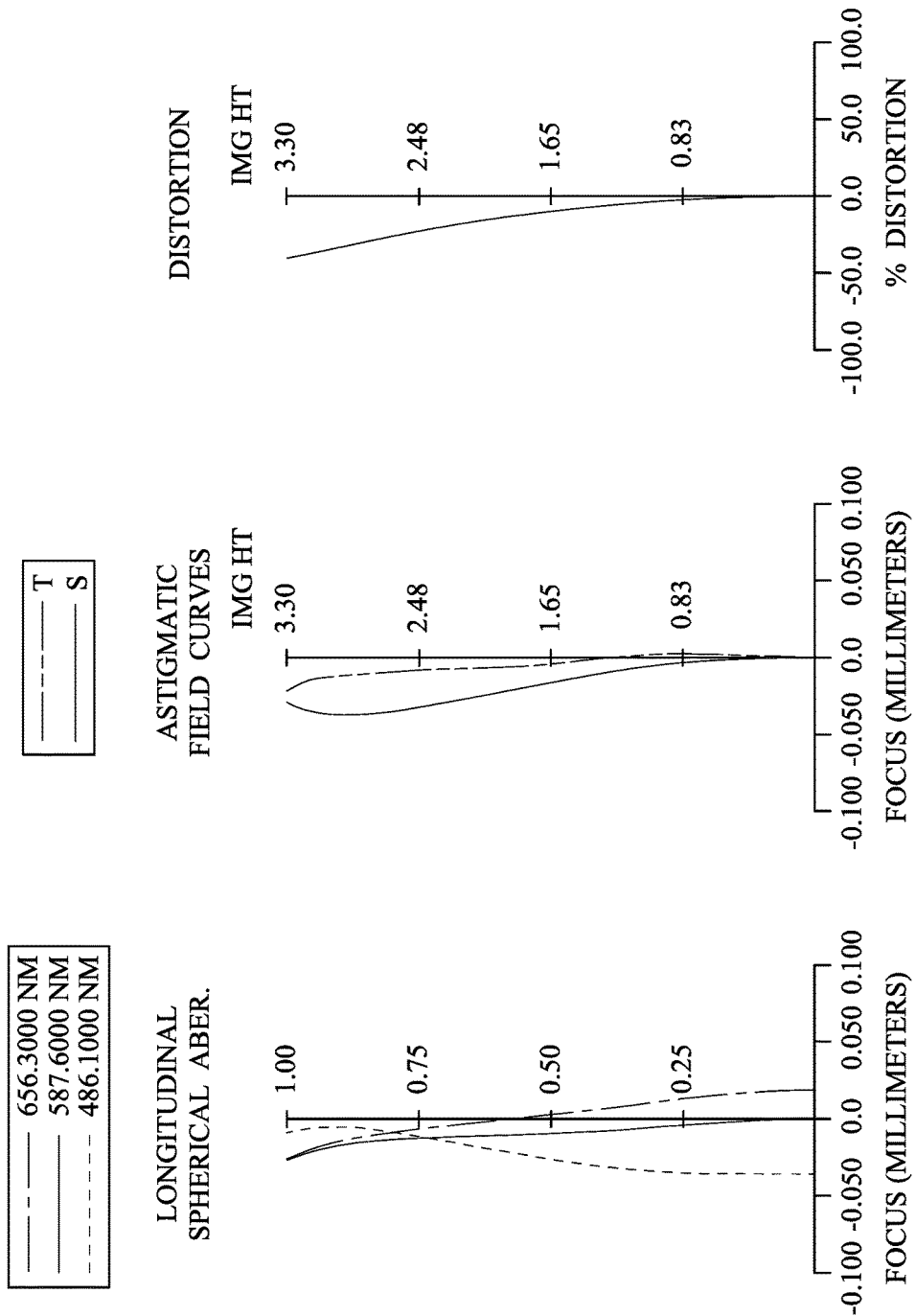
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment. In FIG. 1, the image capturing apparatus includes the imaging optical lens assembly (its reference numeral is omitted) and an image sensor 190. The imaging optical lens assembly includes, in order from an object side to an image side, a first lens element 110, a second lens element 120, a third lens element 130, an aperture stop 100, a fourth lens element 140, a fifth lens element 150, an IR-cut filter 160, a cover glass 170 and an image surface 180. The image sensor 190 is disposed on the image surface 180 of the imaging optical lens assembly. The imaging optical lens assembly has a total of five lens elements (110-150).

The first lens element 110 with negative refractive power has an object-side surface 111 being convex and an image-side surface 112 being concave. The first lens element 110 is made of a plastic material, and has the object-side surface 111 and the image-side surface 112 being both aspheric.

The second lens element 120 with negative refractive power has an object-side surface 121 being concave and an image-side surface 122 being convex. The second lens element 120 is made of a plastic material, and has the object-side surface 121 and the image-side surface 122 being both aspheric. Furthermore, the image-side surface 122 of the second lens element 120 includes at least one inflection point.

The third lens element 130 with positive refractive power has an object-side surface 131 being concave and an image-side surface 132 being convex. The third lens element 130 is made of a plastic material, and has the object-side surface 131 and the image-side surface 132 being both aspheric. Furthermore, the object-side surface 131 of the third lens element 130 includes at least one inflection point.

The fourth lens element 140 with positive refractive power has an object-side surface 141 being convex and an image-side surface 142 being convex. The fourth lens element 140 is made of a glass material, and has the object-side surface 141 and the image-side surface 142 being both spherical.

The fifth lens element 150 with negative refractive power has an object-side surface 151 being concave and an image-side surface 152 being convex. The fifth lens element 150 is made of a glass material, and has the object-side surface 151 and the image-side surface 152 being both spherical.

The IR-cut filter 160 and the cover glass 170 are made of glass materials and located between the fifth lens element 150 and the image surface 180 in sequence, and will not affect the focal length of the imaging optical lens assembly.

The equation of the aspheric surface profiles of the aforementioned lens elements of the 1st embodiment is expressed as follows:

$$X(Y) = (Y^2/R)/(1 + sqrt(1 - (1 + k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging optical lens assembly of the image capturing apparatus according to the 1st embodiment, when a focal length of the imaging optical lens assembly is f, and an f-number of the imaging optical lens assembly is Fno, these parameters have the following values: f=3.68 mm; and Fno=2.23.

In the imaging optical lens assembly of the image capturing apparatus according to the 1st embodiment, when half of a maximal field of view of the imaging optical lens assembly is HFOV, and the maximal field of view of the imaging optical lens assembly is FOV, the following conditions are satisfied: HFOV=56.4 degrees; and FOV=112.8 degrees.

In the imaging optical lens assembly of the image capturing apparatus according to the 1st embodiment, when an Abbe number of the second lens element 120 is V2, the following condition is satisfied: V2=23.4.

In the imaging optical lens assembly of the image capturing apparatus according to the 1st embodiment, when an axial distance between the first lens element 110 and the second lens element 120 is T12, and an axial distance between the second lens element 120 and the third lens element 130 is T23, the following condition is satisfied: T12/T23=7.73.

In the imaging optical lens assembly of the image capturing apparatus according to the 1st embodiment, when the axial distance between the first lens element 110 and the second lens element 120 is T12, and an axial distance between the third lens element 130 and the fourth lens element 140 is T34, the following condition is satisfied: T12/T34=0.57.

In the imaging optical lens assembly of the image capturing apparatus according to the 1st embodiment, when a central thickness of the second lens element 120 is CT2, and a central thickness of the third lens element 130 is CT3, the following condition is satisfied: CT2/CT3=1.28.

In the imaging optical lens assembly of the image capturing apparatus according to the 1st embodiment, when a maximal effective radius of the object-side surface 111 of the first lens element 110 is Y11, and a maximal image height of the imaging optical lens assembly (half of a diagonal length of an effective photosensitive area of the image sensor 190) is ImgH, the following condition is satisfied: Y11/ImgH=1.34.

In the imaging optical lens assembly of the image capturing apparatus according to the 1st embodiment, when the focal length of the imaging optical lens assembly is f, a curvature radius of the object-side surface 131 of the third lens element 130 is R5, and a curvature radius of the image-side surface 132 of the third lens element 130 is R6, the following condition is satisfied: (f/R5)+(f/R6)=−1.13.

In the imaging optical lens assembly of the image capturing apparatus according to the 1st embodiment, when a curvature radius of the object-side surface 141 of the fourth lens element 140 is R7, and a curvature radius of the image-side surface 142 of the fourth lens element 140 is R8, the following condition is satisfied: (R7+R8)/(R7−R8)=0.14.

In the imaging optical lens assembly of the image capturing apparatus according to the 1st embodiment, when the focal length of the imaging optical lens assembly is f, and a composite focal length of the first lens element 110, the second lens element 120 and the third lens element 130 is f123, the following condition is satisfied: f/f123=0.49.

In the imaging optical lens assembly of the image capturing apparatus according to the 1st embodiment, when a focal length of the first lens element 110 is f1, and a focal length of the fourth lens element 140 is f4, the following condition is satisfied: |f1/f4|=1.16.

In the imaging optical lens assembly of the image capturing apparatus according to the 1st embodiment, when a focal length of the second lens element 120 is f2, a focal length of the third lens element 130 is f3, the focal length of the fourth lens element 140 is f4, and a focal length of the fifth lens element 150 is f5, the following condition is satisfied: |f4/f2|+|f4/f3|+|f4/f5|=1.45.

In the imaging optical lens assembly of the image capturing apparatus according to the 1st embodiment, when the focal length of the imaging optical lens assembly is f, the focal length of the first lens element 110 is f1, the focal length of the second lens element 120 is f2, the focal length of the third lens element 130 is f3, the focal length of the fourth lens element 140 is f4, and the focal length of the fifth lens element 150 is f5, the following conditions are satisfied: $|f/f1|=0.70$; $|f/f2|=0.01$; $|f/f3|=0.55$; $|f/f4|=0.82$; and $|f/f5|=0.63$.

The detailed optical data of the 1st embodiment are shown in TABLE 1 and the aspheric surface data are shown in TABLE 2 below.

TABLE 1

1st Embodiment
f = 3.68 mm, Fno = 2.23, HFOV = 56.4 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 23.649 | ASP | 1.102 | Plastic | 1.544 | 55.9 | −5.23 |
| 2 |  | 2.497 | ASP | 1.887 |  |  |  |  |
| 3 | Lens 2 | −22.763 | ASP | 3.200 | Plastic | 1.633 | 23.4 | −329.93 |
| 4 |  | −26.941 | ASP | 0.244 |  |  |  |  |
| 5 | Lens 3 | −48.942 | ASP | 2.492 | Plastic | 1.544 | 55.9 | 6.75 |
| 6 |  | −3.478 | ASP | −0.519 |  |  |  |  |
| 7 | Ape. Stop | Plano |  | 3.828 |  |  |  |  |
| 8 | Lens 4 | 5.998 |  | 2.231 | Glass | 1.620 | 60.3 | 4.51 |
| 9 |  | −4.503 |  | 0.070 |  |  |  |  |
| 10 | Lens 5 | −4.311 |  | 0.500 | Glass | 1.847 | 23.8 | −5.86 |
| 11 |  | −34.753 |  | 1.000 |  |  |  |  |
| 12 | IR-cut filter | Plano |  | 0.300 | Glass | 1.517 | 64.2 | — |
| 13 |  | Plano |  | 1.000 |  |  |  |  |
| 14 | Cover glass | Plano |  | 0.500 | Glass | 1.517 | 64.2 | — |
| 15 |  | Plano |  | 1.887 |  |  |  |  |
| 16 | Image | Plano |  | — |  |  |  |  |

Reference wavelength is 587.6 nm (d-line).
Effective radius of Surface 8 is 2.450 mm.

TABLE 2

Aspheric Coefficients

| Surface # | 1 | 2 | 3 |
|---|---|---|---|
| k = | −1.0000E+00 | −8.9345E−02 | −2.3631E+01 |
| A4 = | −1.7750E−03 | −1.6441E−03 | 8.9200E−04 |
| A6 = | 1.5774E−04 | −3.3837E−04 | −7.9833E−04 |
| A8 = | −4.8791E−06 | 2.6744E−05 | 1.5105E−05 |
| A10 = | 8.1925E−08 | −7.5172E−06 | −1.1539E−05 |
| A12 = | −1.8707E−11 | −4.1527E−20 |  |

| Surface # | 4 | 5 | 6 |
|---|---|---|---|
| k = | −9.9000E+01 | 8.4772E+01 | 2.0672E−01 |
| A4 = | 2.1134E−02 | 1.9684E−02 | 9.8747E−04 |
| A6 = | −1.6245E−03 | −3.2573E−03 | −1.0951E−04 |
| A8 = | −5.1946E−04 | −8.6478E−05 | 8.5370E−06 |
| A10 = | 1.4455E−04 | 7.2680E−05 | −5.2382E−07 |

In TABLE 1, the curvature radius, the thickness and the focal length are shown in millimeters (mm). Surface numbers 0-16 represent the surfaces sequentially arranged from the object-side to the image-side along the optical axis. In TABLE 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
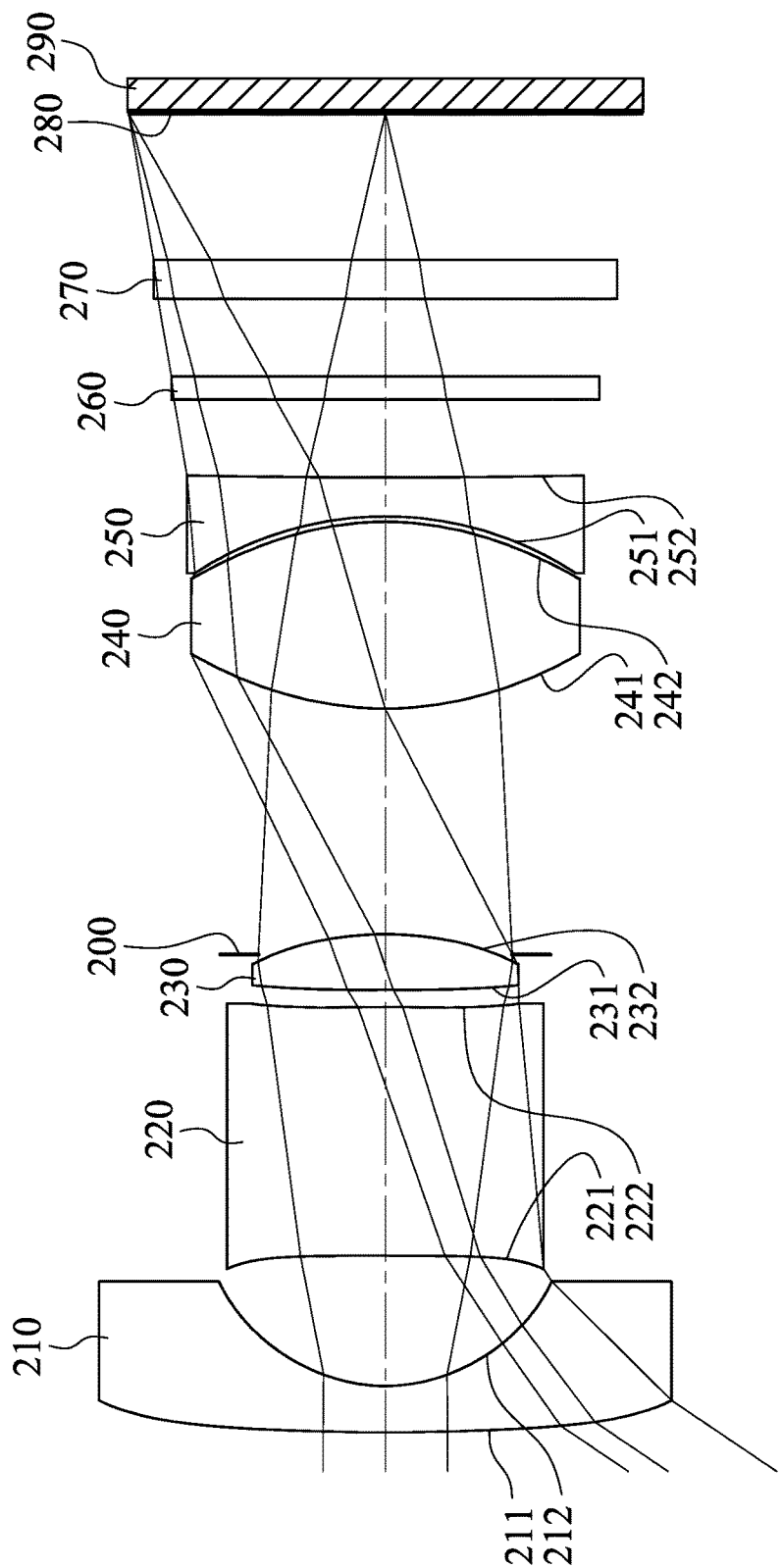
FIG. 3 is a schematic view of an image capturing apparatus according to the 2nd embodiment of the present disclosure.
Figure 4:
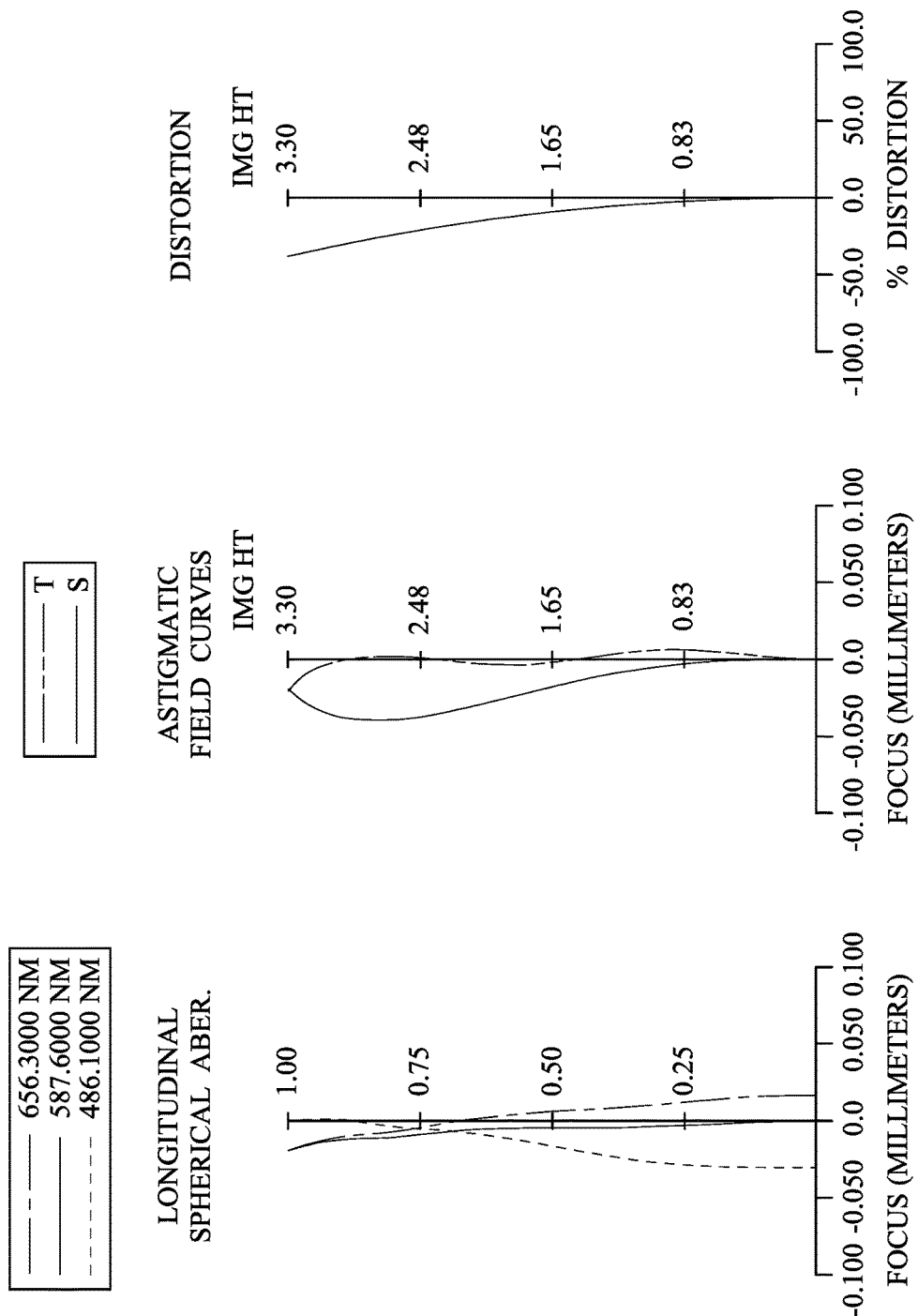
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes the imaging optical lens assembly (its reference numeral is omitted) and an image sensor 290. The imaging optical lens assembly includes, in order from an object side to an image side, a first lens element 210, a second lens element 220, a third lens element 230, an aperture stop 200, a fourth lens element 240, a fifth lens element 250, an IR-cut filter 260, a cover glass 270 and an image surface 280. The image sensor 290 is disposed on the image surface 280 of the imaging optical lens assembly. The imaging optical lens assembly has a total of five lens elements (210-250).

The first lens element 210 with negative refractive power has an object-side surface 211 being convex and an image-side surface 212 being concave. The first lens element 210 is made of a plastic material, and has the object-side surface 211 and the image-side surface 212 being both aspheric.

The second lens element 220 with positive refractive power has an object-side surface 221 being concave and an image-side surface 222 being convex. The second lens element 220 is made of a plastic material, and has the object-side surface 221 and the image-side surface 222 being both aspheric. Furthermore, the image-side surface 222 of the second lens element 220 includes at least one inflection point.

The third lens element 230 with positive refractive power has an object-side surface 231 being concave and an image-side surface 232 being convex. The third lens element 230 is made of a plastic material, and has the object-side surface 231 and the image-side surface 232 being both aspheric. Furthermore, the object-side surface 231 of the third lens element 230 includes at least one inflection point.

The fourth lens element 240 with positive refractive power has an object-side surface 241 being convex and an image-side surface 242 being convex. The fourth lens element 240 is made of a glass material, and has the object-side surface 241 and the image-side surface 242 being both aspheric.

The fifth lens element 250 with negative refractive power has an object-side surface 251 being concave and an image-side surface 252 being concave. The fifth lens element 250 is made of a glass material, and has the object-side surface 251 and the image-side surface 252 being both spherical.

The IR-cut filter 260 and the cover glass 270 are made of glass materials and located between the fifth lens element 250 and the image surface 280 in sequence, and will not affect the focal length of the imaging optical lens assembly.

The detailed optical data of the 2nd embodiment are shown in TABLE 3 and the aspheric surface data are shown in TABLE 4 below.

TABLE 3

2nd Embodiment
f = 3.58 mm, Fno = 2.23, HFOV = 56.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 23.172 | ASP | 0.600 | Plastic | 1.544 | 55.9 | −4.60 |
| 2 | | 2.237 | ASP | 1.679 | | | | |
| 3 | Lens 2 | −81.211 | ASP | 3.200 | Plastic | 1.633 | 23.4 | 48.98 |
| 4 | | −22.777 | ASP | 0.221 | | | | |
| 5 | Lens 3 | −60.848 | ASP | 0.715 | Plastic | 1.544 | 55.9 | 8.81 |
| 6 | | −4.461 | ASP | −0.261 | | | | |
| 7 | Ape. Stop | Plano | | 3.167 | | | | |
| 8 | Lens 4 | 4.406 | ASP | 2.406 | Glass | 1.670 | 55.4 | 3.58 |
| 9 | | −4.103 | ASP | 0.070 | | | | |
| 10 | Lens 5 | −4.457 | | 0.500 | Glass | 1.847 | 23.8 | −5.08 |
| 11 | | 131.425 | | 1.000 | | | | |
| 12 | IR-cut filter | Plano | | 0.300 | Glass | 1.517 | 64.2 | — |
| 13 | | Plano | | 1.000 | | | | |
| 14 | Cover glass | Plano | | 0.500 | Glass | 1.517 | 64.2 | — |
| 15 | | Plano | | 1.903 | | | | |
| 16 | Image | Plano | | — | | | | |

Reference wavelength is 587.6 nm (d-line).
Effective radius of Surface 8 is 2.500 mm.

TABLE 4

Aspheric Coefficients

| Surface # | 1 | 2 | 3 | 4 |
|---|---|---|---|---|
| k = | −1.0000E+00 | −8.0977E−02 | −3.7545E+01 | −9.8219E+01 |
| A4 = | −2.9871E−03 | −3.9507E−03 | −1.9295E−03 | 1.9999E−02 |
| A6 = | 5.4557E−04 | −9.1744E−04 | −1.9205E−03 | −3.1925E−03 |
| A8 = | −3.2720E−05 | 1.8791E−04 | 3.9002E−04 | −6.7289E−04 |
| A10 = | 9.0508E−07 | −1.5682E−05 | −7.7721E−05 | 2.7207E−04 |
| A12 = | −1.8707E−11 | 4.3046E−18 | | |

| Surface # | 5 | 6 | 8 | 9 |
|---|---|---|---|---|
| k = | −9.8100E+01 | 8.4794E−01 | −7.1953E−01 | −5.9365E−01 |
| A4 = | 2.2314E−02 | −2.3057E−03 | −1.2818E−03 | 1.6116E−03 |
| A6 = | −4.0626E−03 | 5.1223E−04 | 1.3794E−04 | −1.1390E−04 |
| A8 = | −9.8354E−04 | −6.9060E−04 | −3.7006E−06 | 1.9793E−05 |
| A10 = | 3.0074E−04 | 9.4144E−05 | 5.0076E−07 | −1.2919E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 3.58 | (R7 + R8)/(R7 − R8) | 0.04 |
| Fno | 2.23 | f/f123 | 0.15 |
| HFOV (deg.) | 56.0 | |f1/f4| | 1.28 |
| FOV (deg.) | 112.0 | |f4/f2| + |f4/f3| + |f4/f5| | 1.18 |
| V2 | 23.4 | |f/f1| | 0.78 |
| T12/T23 | 7.60 | |f/f2| | 0.07 |

-continued

| 2nd Embodiment | | | |
|---|---|---|---|
| T12/T34 | 0.58 | |f/f3| | 0.41 |
| CT2/CT3 | 4.48 | |f/f4| | 1.00 |
| Y11/ImgH | 1.11 | |f/f5| | 0.70 |
| (f/R5) + (f/R6) | −0.86 | | |

3rd Embodiment

Figure 5:
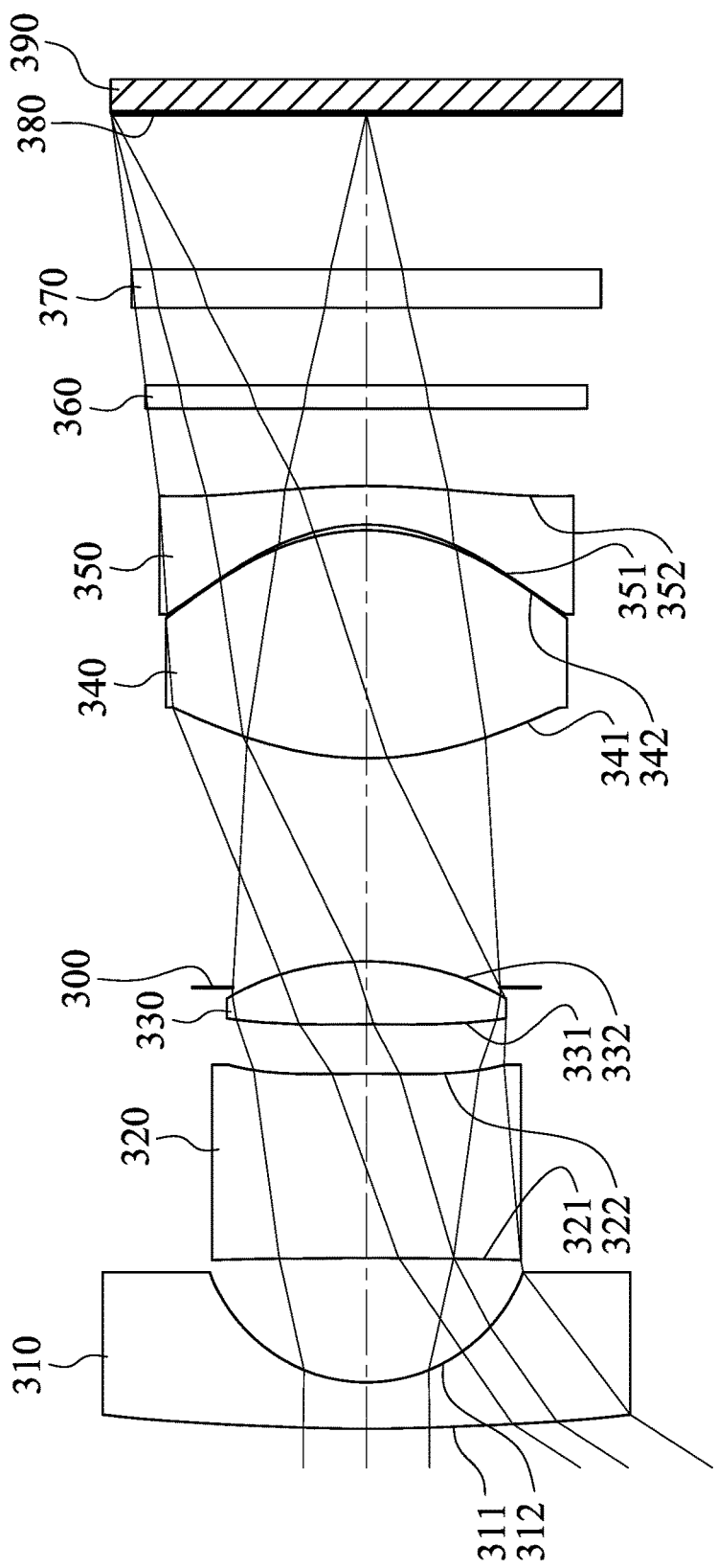
FIG. 5 is a schematic view of an image capturing apparatus according to the 3rd embodiment of the present disclosure.
Figure 6:
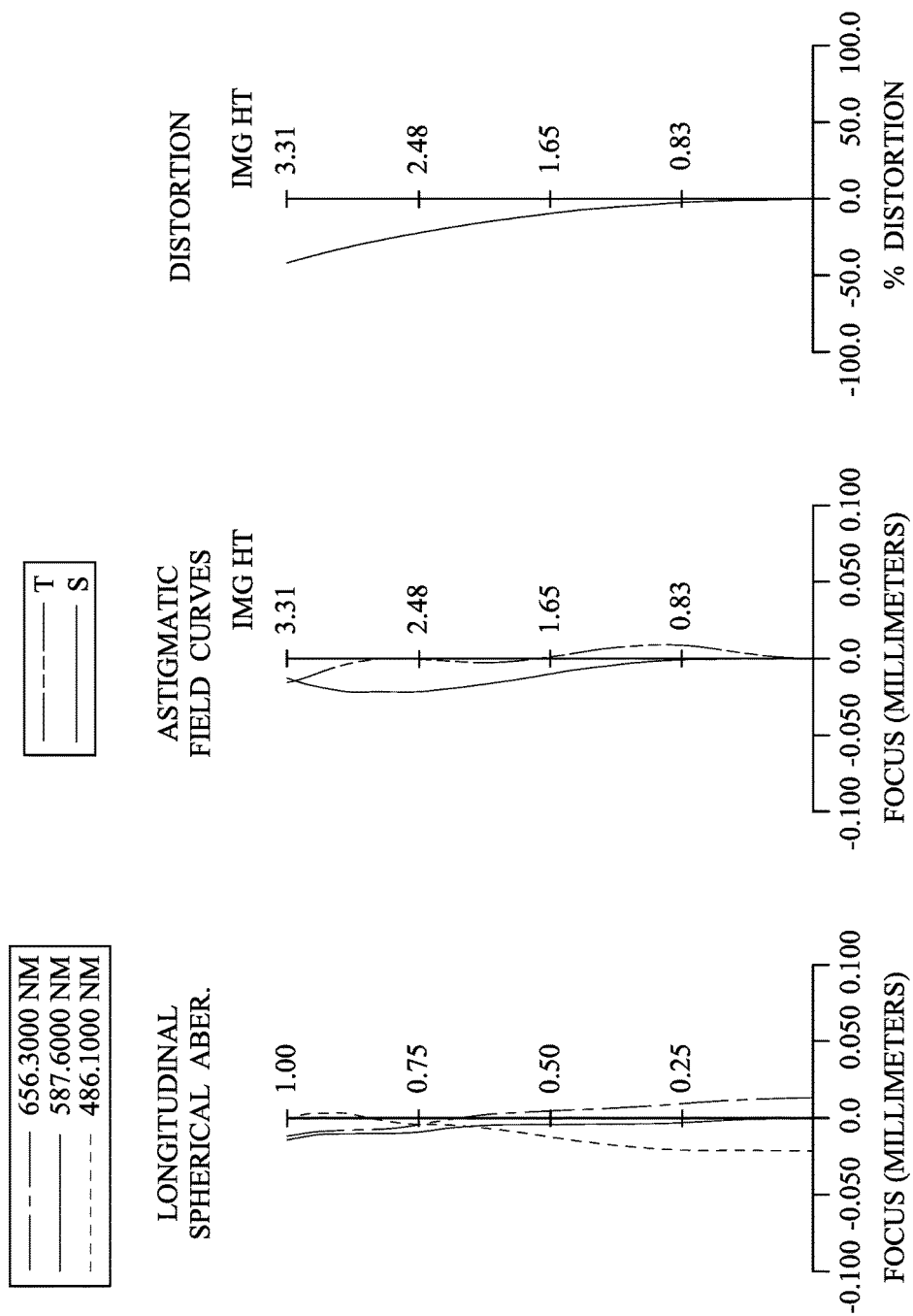
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to the 3rd embodiment. In FIG. 5, the image capturing apparatus includes the imaging optical lens assembly (its reference numeral is omitted) and an image sensor 390. The imaging optical lens assembly includes, in order from an object side to an image side, a first lens element 310, a second lens element 320, a third lens element 330, an aperture stop 300, a fourth lens element 340, a fifth lens element 350, an IR-cut filter 360, a cover glass 370 and an image surface 380. The image sensor 390 is disposed on the image surface 380 of the imaging optical lens assembly. The imaging optical lens assembly has a total of five lens elements (310-350).

The first lens element 310 with negative refractive power has an object-side surface 311 being convex and an image-side surface 312 being concave. The first lens element 310 is made of a plastic material, and has the object-side surface 311 and the image-side surface 312 being both aspheric.

The second lens element 320 with positive refractive power has an object-side surface 321 being concave and an image-side surface 322 being convex. The second lens element 320 is made of a plastic material, and has the object-side surface 321 and the image-side surface 322 being both aspheric. Furthermore, both of the object-side surface 321 and the image-side surface 322 of the second lens element 320 include at least one inflection point.

The third lens element 330 with positive refractive power has an object-side surface 331 being concave and an image-side surface 332 being convex. The third lens element 330 is made of a plastic material, and has the object-side surface 331 and the image-side surface 332 being both aspheric. Furthermore, the object-side surface 331 of the third lens element 330 includes at least one inflection point.

The fourth lens element 340 with positive refractive power has an object-side surface 341 being convex and an image-side surface 342 being convex. The fourth lens element 340 is made of a plastic material, and has the object-side surface 341 and the image-side surface 342 being both aspheric.

The fifth lens element 350 with negative refractive power has an object-side surface 351 being concave and an image-side surface 352 being convex. The fifth lens element 350 is made of a plastic material, and has the object-side surface 351 and the image-side surface 352 being both aspheric.

The IR-cut filter 360 and the cover glass 370 are made of glass materials and located between the fifth lens element 350 and the image surface 380 in sequence, and will not affect the focal length of the imaging optical lens assembly.

The detailed optical data of the 3rd embodiment are shown in TABLE 5 and the aspheric surface data are shown in TABLE 6 below.

TABLE 5

3rd Embodiment
f = 3.64 mm, Fno = 2.23, HFOV = 57.2 deg.

| Surface # |           | Curvature Radius |     | Thickness | Material | Index | Abbe # | Focal Length |
|-----------|-----------|------------------|-----|-----------|----------|-------|--------|--------------|
| 0         | Object    | Plano            |     | Infinity  |          |       |        |              |
| 1         | Lens 1    | 21.167           | ASP | 0.600     | Plastic  | 1.544 | 55.9   | −4.36        |
| 2         |           | 2.113            | ASP | 1.610     |          |       |        |              |
| 3         | Lens 2    | −34.854          | ASP | 2.381     | Plastic  | 1.633 | 23.4   | 452.39       |
| 4         |           | −31.894          | ASP | 0.638     |          |       |        |              |
| 5         | Lens 3    | −60.848          | ASP | 0.811     | Plastic  | 1.544 | 55.9   | 7.53         |
| 6         |           | −3.857           | ASP | −0.334    |          |       |        |              |
| 7         | Ape. Stop | Plano            |     | 2.962     |          |       |        |              |
| 8         | Lens 4    | 4.415            | ASP | 2.942     | Plastic  | 1.544 | 55.9   | 3.68         |
| 9         |           | −2.800           | ASP | 0.076     |          |       |        |              |
| 10        | Lens 5    | −2.396           | ASP | 0.500     | Plastic  | 1.633 | 23.4   | −5.18        |
| 11        |           | −9.655           | ASP | 1.000     |          |       |        |              |
| 12        | IR-cut filter | Plano        |     | 0.300     | Glass    | 1.517 | 64.2   | —            |
| 13        |           | Plano            |     | 1.000     |          |       |        |              |
| 14        | Cover glass | Plano          |     | 0.500     | Glass    | 1.517 | 64.2   | —            |
| 15        |           | Plano            |     | 2.015     |          |       |        |              |
| 16        | Image     | Plano            |     | —         |          |       |        |              |

Reference wavelength is 587.6 nm (d-line).
Effective radius of Surface 8 is 2.500 mm.

TABLE 6

Aspheric Coefficients

| Surface # | 1 | 2 | 3 | 4 | 5 |
|-----------|---|---|---|---|---|
| k =   | −1.0000E+00 | −9.0822E−03 | −5.3641E+01 | −9.9000E+01 | 1.8101E+00 |
| A4 =  | −2.2595E−03 | 2.0119E−06  | 5.3448E−03  | 1.9352E−02  | 1.5801E−02 |
| A6 =  | 1.9788E−04  | −7.1324E−04 | −6.0201E−04 | −9.1191E−04 | −1.9459E−03 |
| A8 =  | −5.5565E−06 | 2.0119E−04  | −1.2960E−04 | −2.7338E−04 | −1.5932E−04 |
| A10 = | 2.4582E−08  | −6.1518E−05 | 7.8286E−06  | 6.8510E−05  | 5.7358E−05 |
| A12 = | −1.8707E−11 | 4.3410E−18  |             |             |             |

TABLE 6-continued

| Aspheric Coefficients | | | | | |
|---|---|---|---|---|---|
| Surface # | 6 | 8 | 9 | 10 | 11 |
| k = | 2.6604E−01 | −6.8369E−01 | −5.8869E−01 | −5.5103E−01 | −1.0000E+00 |
| A4 = | −1.4035E−03 | −1.1598E−03 | 1.0910E−03 | 6.6192E−03 | 5.1689E−03 |
| A6 = | 9.2727E−05 | −3.9863E−05 | 2.1956E−04 | 5.4373E−04 | 3.4214E−05 |
| A8 = | −2.7524E−04 | 8.5417E−06 | 7.3508E−05 | −4.9342E−06 | −1.5421E−05 |
| A10 = | 4.3237E−05 | −3.3414E−06 | −5.5020E−06 | 2.4078E−06 | 8.6233E−08 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 3.64 | (R7 + R8)/(R7 − R8) | 0.22 |
| Fno | 2.23 | f/f123 | 0.16 |
| HFOV (deg.) | 57.2 | \|f1/f4\| | 1.18 |
| FOV (deg.) | 114.4 | \|f4/f2\| + \|f4/f3\| + \|f4/f5\| | 1.21 |
| V2 | 23.4 | \|f/f1\| | 0.83 |
| T12/T23 | 2.52 | \|f/f2\| | 0.01 |
| T12/T34 | 0.61 | \|f/f3\| | 0.48 |
| CT2/CT3 | 2.94 | \|f/f4\| | 0.99 |
| Y11/ImgH | 1.03 | \|f/f5\| | 0.70 |
| (f/R5) + (f/R6) | −1.00 | | |

4th Embodiment

Figure 7:
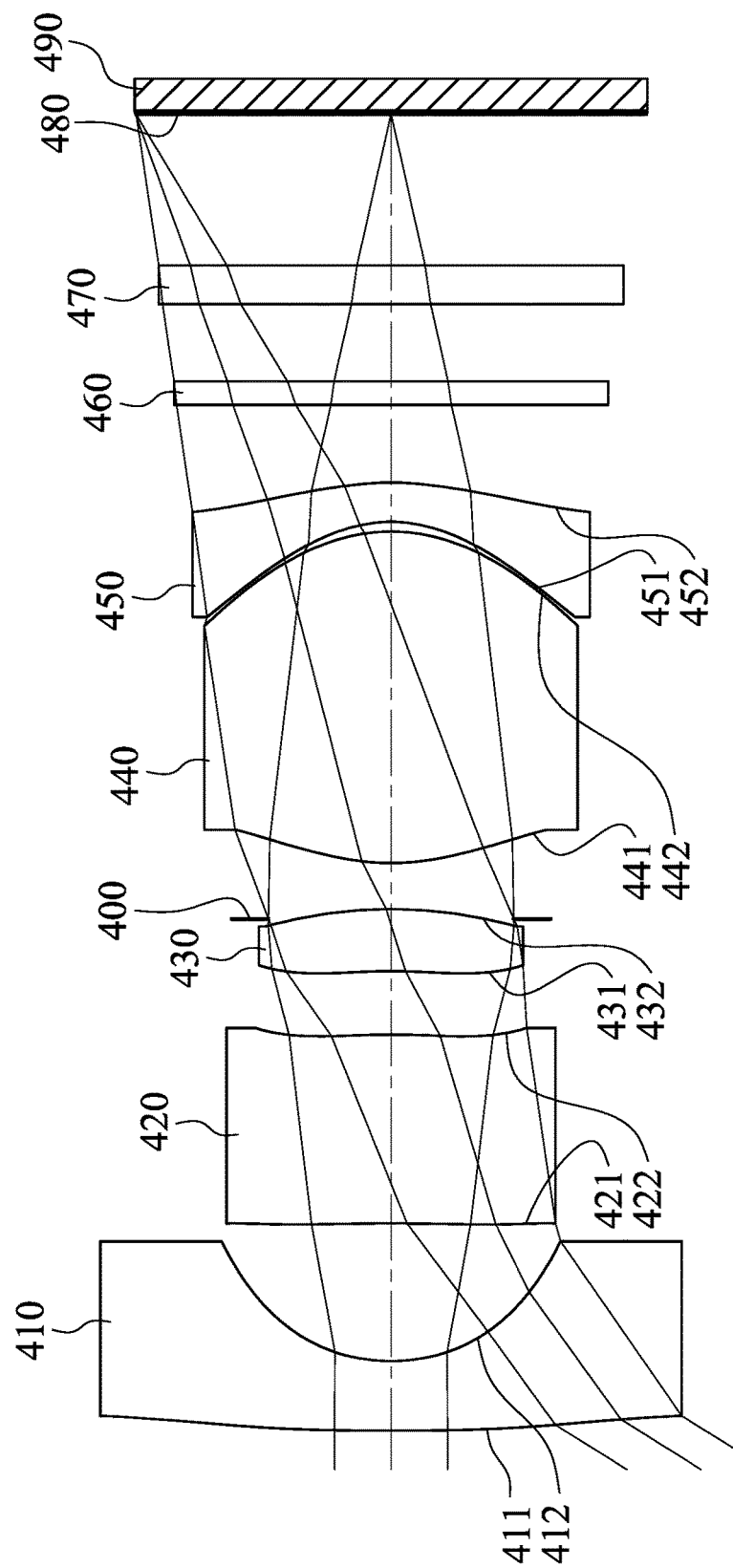
FIG. 7 is a schematic view of an image capturing apparatus according to the 4th embodiment of the present disclosure.
Figure 8:
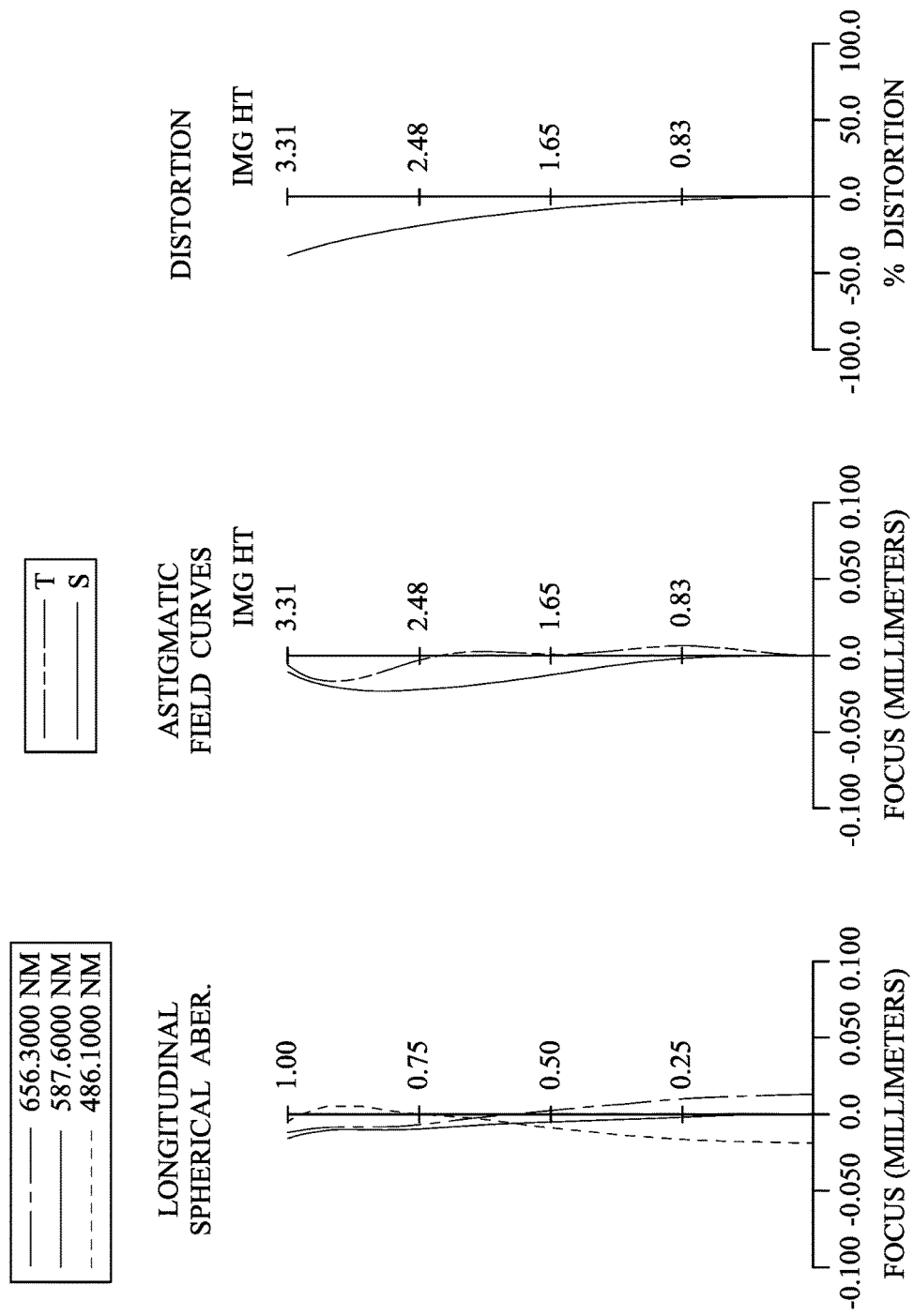
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment. In FIG. 7, the image capturing apparatus includes the imaging optical lens assembly (its reference numeral is omitted) and an image sensor 490. The imaging optical lens assembly includes, in order from an object side to an image side, a first lens element 410, a second lens element 420, a third lens element 430, an aperture stop 400, a fourth lens element 440, a fifth lens element 450, an IR-cut filter 460, a cover glass 470 and an image surface 480. The image sensor 490 is disposed on the image surface 480 of the imaging optical lens assembly. The imaging optical lens assembly has a total of five lens elements (410-450).

The first lens element 410 with negative refractive power has an object-side surface 411 being convex and an image-side surface 412 being concave. The first lens element 410 is made of a plastic material, and has the object-side surface 411 and the image-side surface 412 being both aspheric.

The second lens element 420 with positive refractive power has an object-side surface 421 being concave and an image-side surface 422 being convex. The second lens element 420 is made of a plastic material, and has the object-side surface 421 and the image-side surface 422 being both aspheric. Furthermore, both of the object-side surface 421 and the image-side surface 422 of the second lens element 420 include at least one inflection point.

The third lens element 430 with positive refractive power has an object-side surface 431 being concave and an image-side surface 432 being convex. The third lens element 430 is made of a plastic material, and has the object-side surface 431 and the image-side surface 432 being both aspheric. Furthermore, the object-side surface 431 of the third lens element 430 includes at least one inflection point.

The fourth lens element 440 with positive refractive power has an object-side surface 441 being convex and an image-side surface 442 being convex. The fourth lens element 440 is made of a plastic material, and has the object-side surface 441 and the image-side surface 442 being both aspheric.

The fifth lens element 450 with negative refractive power has an object-side surface 451 being concave and an image-side surface 452 being convex. The fifth lens element 450 is made of a plastic material, and has the object-side surface 451 and the image-side surface 452 being both aspheric.

The IR-cut filter 460 and the cover glass 470 are made of glass materials and located between the fifth lens element 450 and the image surface 480 in sequence, and will not affect the focal length of the imaging optical lens assembly.

The detailed optical data of the 4th embodiment are shown in TABLE 7 and the aspheric surface data are shown in TABLE 8 below.

TABLE 7

4th Embodiment
f = 3.35 mm, Fno = 2.30, HFOV = 58.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 53.549 | ASP | 0.895 | Plastic | 1.544 | 56.0 | −4.46 |
| 2 | | 2.310 | ASP | 1.779 | | | | |
| 3 | Lens 2 | −26.143 | ASP | 2.436 | Plastic | 1.584 | 28.2 | 24.81 |
| 4 | | −9.647 | ASP | 0.816 | | | | |
| 5 | Lens 3 | −7.386 | ASP | 0.798 | Plastic | 1.544 | 56.0 | 61.81 |
| 6 | | −6.287 | ASP | −0.123 | | | | |
| 7 | Ape. Stop | Plano | | 0.722 | | | | |
| 8 | Lens 4 | 3.248 | ASP | 4.274 | Plastic | 1.544 | 56.0 | 3.39 |
| 9 | | −2.282 | ASP | 0.128 | | | | |

TABLE 7-continued

4th Embodiment
f = 3.35 mm, Fno = 2.30, HFOV = 58.0 deg.

| Surface # | | Curvature Radius | | Thickness | Material | Index | Abbe # | Focal Length |
|---|---|---|---|---|---|---|---|---|
| 10 | Lens 5 | −1.756 | ASP | 0.505 | Plastic | 1.660 | 20.4 | −5.23 |
| 11 | | −3.982 | ASP | 1.000 | | | | |
| 12 | IR-cut filter | Plano | | 0.300 | Glass | 1.517 | 64.2 | — |
| 13 | | Plano | | 1.000 | | | | |
| 14 | Cover glass | Plano | | 0.500 | Glass | 1.517 | 64.2 | — |
| 15 | | Plano | | 1.969 | | | | |
| 16 | Image | Plano | | — | | | | |

Reference wavelength is 587.6 nm (d-line).

TABLE 8

Aspheric Coefficients

| Surface # | 1 | 2 | 3 | 4 | 5 |
|---|---|---|---|---|---|
| k = | −1.0000E+00 | −7.3229E−01 | −9.9000E+01 | −9.9000E+01 | −4.4130E+01 |
| A4 = | 3.0929E−03 | 1.3520E−02 | 5.0926E−03 | 1.5119E−02 | 3.2160E−02 |
| A6 = | −4.0540E−04 | 4.7611E−04 | 7.4164E−04 | 5.5886E−03 | −2.5613E−03 |
| A8 = | 1.9478E−05 | 4.2899E−04 | −1.7611E−04 | −1.6720E−03 | −1.5003E−04 |
| A10 = | −3.4127E−07 | −5.6233E−05 | −1.4492E−05 | 1.2146E−04 | 8.1511E−05 |
| A12 = | −1.8707E−11 | 4.3420E−18 | | | |

| Surface # | 6 | 8 | 9 | 10 | 11 |
|---|---|---|---|---|---|
| k = | 1.9300E+00 | −4.4636E+00 | −8.3417E−01 | −6.8637E−01 | −1.0000E+00 |
| A4 = | −2.1314E−03 | −3.5187E−03 | 1.9718E−03 | 2.8361E−02 | 1.9935E−02 |
| A6 = | 9.2143E−04 | 5.8248E−04 | 9.0408E−04 | −2.0986E−03 | −2.3727E−03 |
| A8 = | −3.2448E−04 | −1.4012E−04 | −2.6245E−04 | 1.4298E−05 | 1.6118E−04 |
| A10 = | 9.6002E−05 | −9.3724E−06 | 2.6079E−05 | 2.9642E−05 | −3.8538E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 3.35 | (R7 + R8)/(R7 − R8) | 0.17 |
| Fno | 2.30 | f/f123 | −0.37 |
| HFOV (deg.) | 58.0 | |f1/f4| | 1.32 |
| FOV (deg.) | 116.0 | |f4/f2| + |f4/f3| + |f4/f5| | 0.84 |
| V2 | 28.2 | |f/f1| | 0.75 |
| T12/T23 | 2.18 | |f/f2| | 0.14 |
| T12/T34 | 2.97 | |f/f3| | 0.05 |
| CT2/CT3 | 3.05 | |f/f4| | 0.99 |
| Y11/ImgH | 1.13 | |f/f5| | 0.64 |
| (f/R5) + (f/R6) | −0.99 | | |

5th Embodiment

Figure 9:
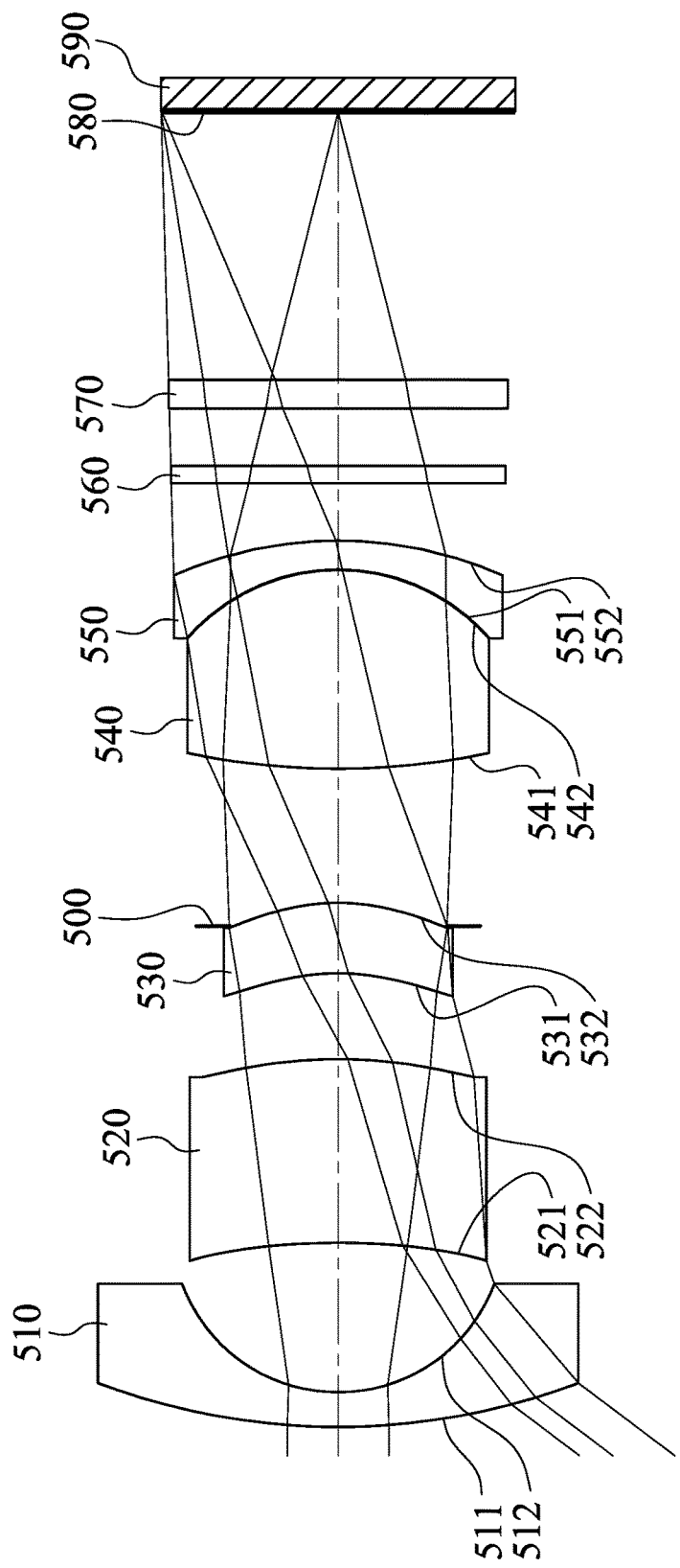
FIG. 9 is a schematic view of an image capturing apparatus according to the 5th embodiment of the present disclosure.
Figure 10:
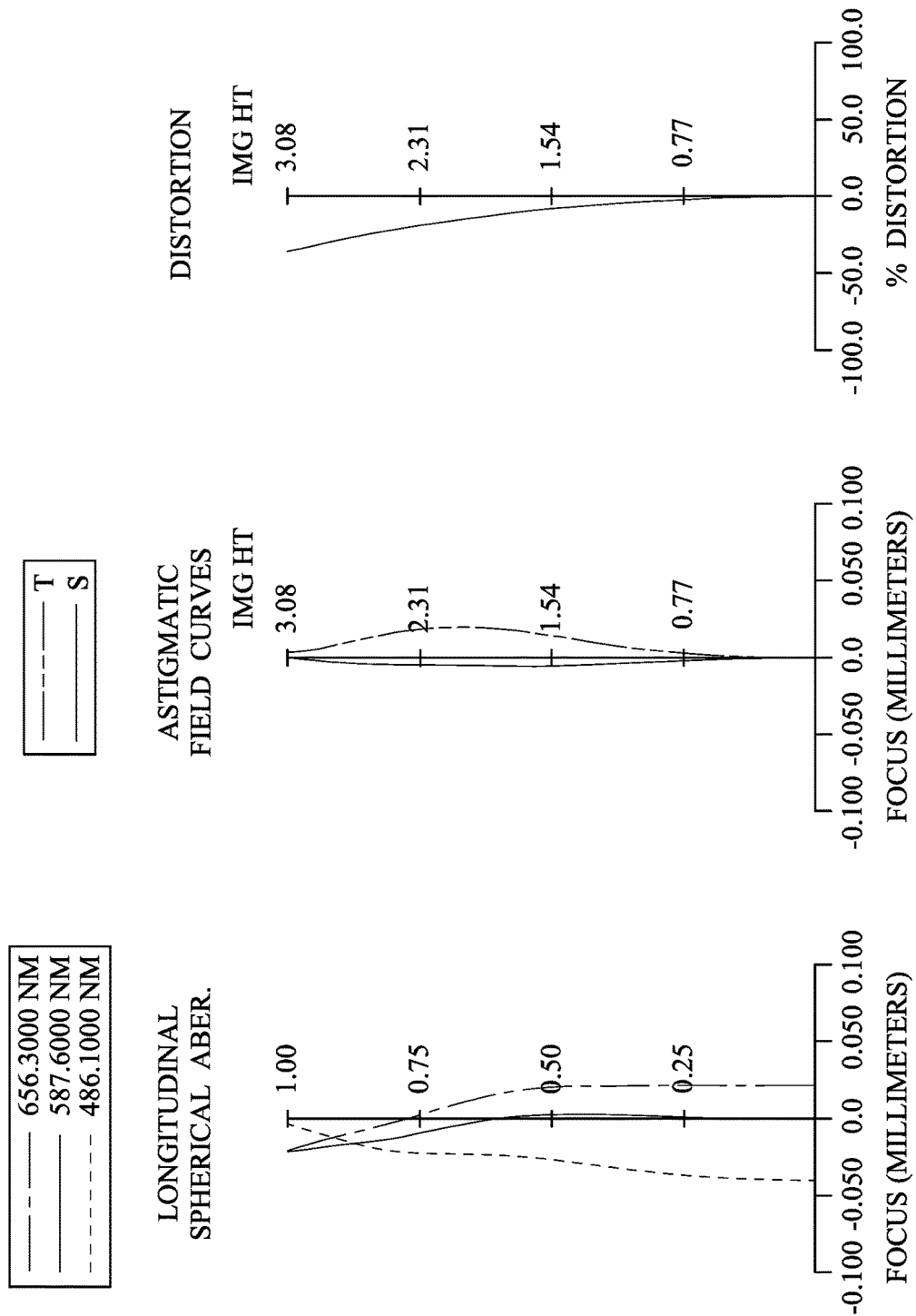
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes the imaging optical lens assembly (its reference numeral is omitted) and an image sensor 590. The imaging optical lens assembly includes, in order from an object side to an image side, a first lens element 510, a second lens element 520, a third lens element 530, an aperture stop 500, a fourth lens element 540, a fifth lens element 550, an IR-cut filter 560, a cover glass 570 and an image surface 580. The image sensor 190 is disposed on the image surface 580 of the imaging optical lens assembly. The imaging optical lens assembly has a total of five lens elements (510-550).

The first lens element 510 with negative refractive power has an object-side surface 511 being convex and an image-side surface 512 being concave. The first lens element 510 is made of a glass material, and has the object-side surface 511 and the image-side surface 512 being both spherical.

The second lens element 520 with positive refractive power has an object-side surface 521 being concave and an image-side surface 522 being convex. The second lens element 520 is made of a plastic material, and has the object-side surface 521 and the image-side surface 522 being both aspheric. Furthermore, the image-side surface 522 of the second lens element 520 includes at least one inflection point.

The third lens element 530 with positive refractive power has an object-side surface 531 being concave and an image-side surface 532 being convex. The third lens element 530 is made of a plastic material, and has the object-side surface 531 and the image-side surface 532 being both aspheric. Furthermore, the object-side surface 531 of the third lens element 530 includes at least one inflection point.

The fourth lens element 540 with positive refractive power has an object-side surface 541 being convex and an image-side surface 542 being convex. The fourth lens element 540 is made of a glass material, and has the object-side surface 541 and the image-side surface 542 being both spherical.

The fifth lens element 550 with negative refractive power has an object-side surface 551 being concave and an image-side surface 552 being convex. The fifth lens element 550 is made of a glass material, and has the object-side surface 551 and the image-side surface 552 being both spherical. The object-side surface 551 of the fifth lens element 550 and the image-side surface 542 of the fourth lens element 540 are cemented.

The IR-cut filter 560 and the cover glass 570 are made of glass materials and located between the fifth lens element 550 and the image surface 580 in sequence, and will not affect the focal length of the imaging optical lens assembly.

The detailed optical data of the 5th embodiment are shown in TABLE 9 and the aspheric surface data are shown in TABLE 10 below.

TABLE 9

5th Embodiment
f = 3.62 mm, Fno = 2.05, HFOV = 53.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 11.855 | 0.600 | Glass | 1.589 | 61.3 | −6.69 |
| 2 | | 2.903 | 2.601 | | | | |
| 3 | Lens 2 | −13.624 ASP | 3.200 | Plastic | 1.639 | 23.5 | 27.83 |
| 4 | | −8.420 ASP | 1.492 | | | | |
| 5 | Lens 3 | −4.089 ASP | 1.225 | Plastic | 1.535 | 55.7 | 40.12 |
| 6 | | −3.793 ASP | −0.401 | | | | |
| 7 | Ape. Stop | Plano | 2.735 | | | | |
| 8 | Lens 4 | 12.725 | 3.460 | Glass | 1.729 | 54.5 | 4.12 |
| 9 | | −3.484 | 0.010 | Cement | 1.514 | 38.8 | |
| 10 | Lens 5 | −3.483 | 0.500 | Glass | 1.847 | 23.8 | −8.67 |
| 11 | | −7.064 | 1.000 | | | | |
| 12 | IR-cut filter | Plano | 0.300 | Glass | 1.517 | 64.2 | — |
| 13 | | Plano | 1.000 | | | | |
| 14 | Cover glass | Plano | 0.500 | Glass | 1.517 | 64.2 | — |
| 15 | | Plano | 4.672 | | | | |
| 16 | Image | Plano | — | | | | |

Reference wavelength is 587.6 nm (d-line).
Effective radius of Surface 8 is 2.300 mm.

TABLE 10

Aspheric Coefficients

| Surface # | 3 | 4 | 5 | 6 |
|---|---|---|---|---|
| k = | −6.2449E+01 | −7.4314E+00 | 1.4001E+00 | 1.1118E+00 |
| A4 = | −4.2179E−03 | −1.4953E−03 | 8.0699E−03 | 6.9977E−03 |
| A6 = | 3.8180E−04 | 1.7438E−04 | 5.3549E−04 | 5.0724E−04 |
| A8 = | −4.2989E−05 | −2.7044E−05 | 5.8715E−05 | 1.6698E−06 |
| A10 = | 1.7348E−06 | 4.4527E−06 | 1.2763E−05 | 1.8212E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

5th Embodiment

| f (mm) | 3.62 | (R7 + R8)/(R7 − R8) | 0.57 |
|---|---|---|---|
| Fno | 2.05 | f/f123 | −0.08 |
| HFOV (deg.) | 53.0 | |f1/f4| | 1.62 |
| FOV (deg.) | 106.0 | |f4/f2| + |f4/f3| + |f4/f5| | 0.73 |
| V2 | 23.5 | |f/f1| | 0.54 |
| T12/T23 | 1.74 | |f/f2| | 0.13 |
| T12/T34 | 1.11 | |f/f3| | 0.09 |
| CT2/CT3 | 2.61 | |f/f4| | 0.88 |
| Y11/ImgH | 1.36 | |f/f5| | 0.42 |
| (f/R5) + (f/R6) | −1.84 | | |

6th Embodiment

Figure 11:
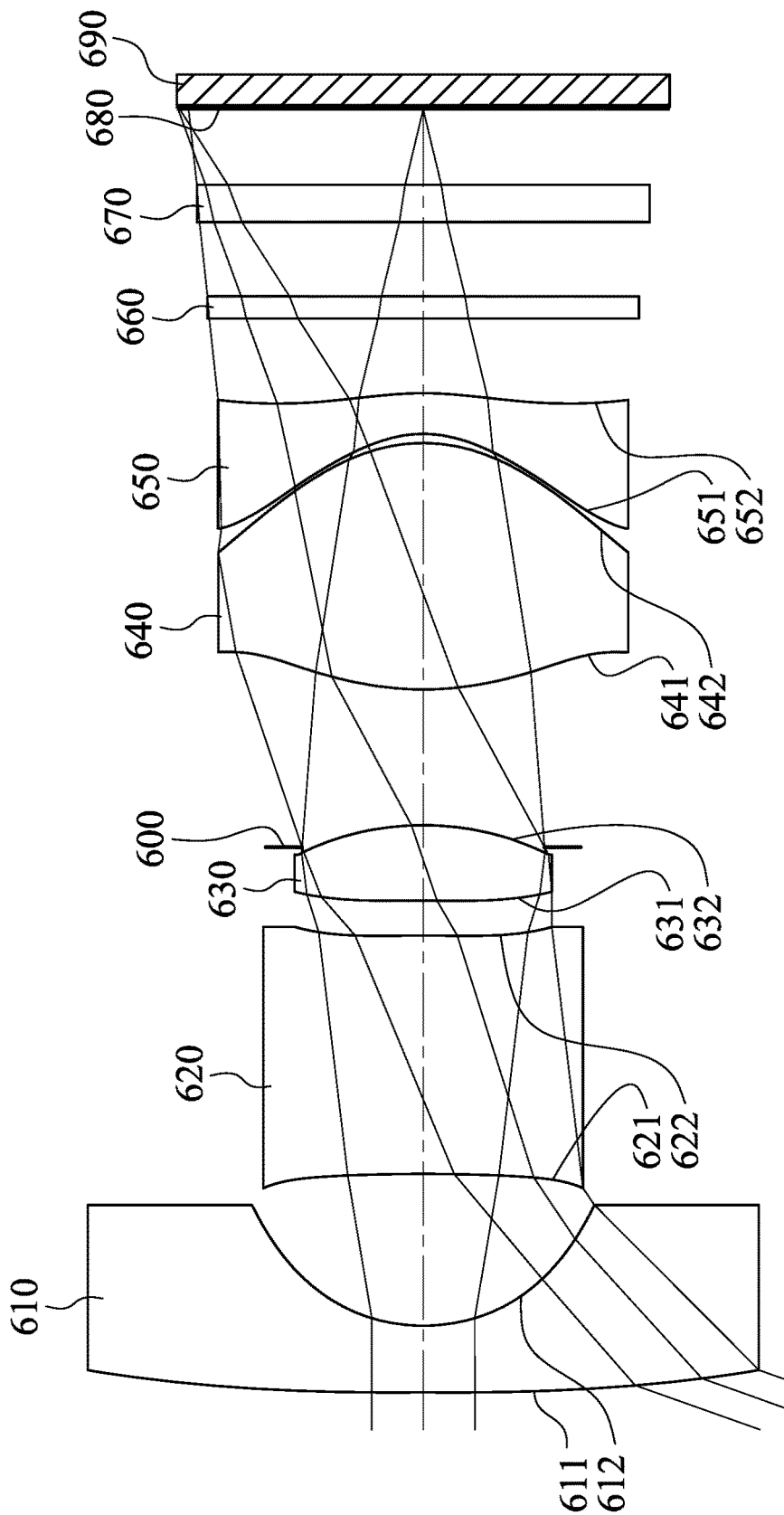
FIG. 11 is a schematic view of an image capturing apparatus according to the 6th embodiment of the present disclosure.
Figure 12:
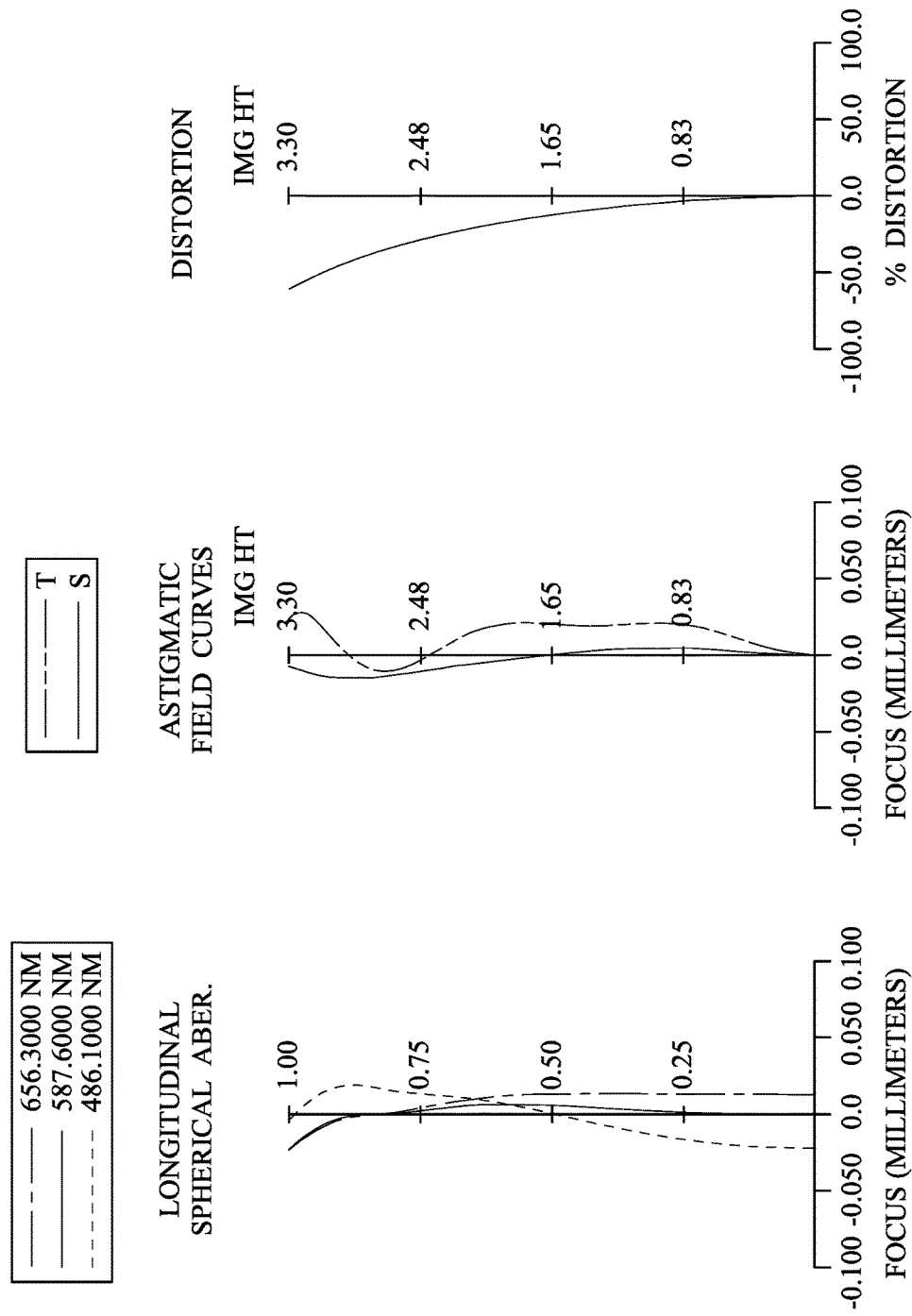
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment. In FIG. 11, the image capturing apparatus includes the imaging optical lens assembly (its reference numeral is omitted) and an image sensor 690. The imaging optical lens assembly includes, in order from an object side to an image side, a first lens element 610, a second lens element 620, a third lens element 630, an aperture stop 600, a fourth lens element 640, a fifth lens element 650, an IR-cut filter 660, a cover glass 670 and an image surface 680. The image sensor 690 is disposed on the image surface 680 of the imaging optical lens assembly. The imaging optical lens assembly has a total of five lens elements (610-650).

The first lens element 610 with negative refractive power has an object-side surface 611 being convex and an image-side surface 612 being concave. The first lens element 610 is made of a plastic material, and has the object-side surface 611 and the image-side surface 612 being both aspheric.

The second lens element 620 with negative refractive power has an object-side surface 621 being concave and an image-side surface 622 being convex. The second lens element 620 is made of a plastic material, and has the object-side surface 621 and the image-side surface 622 being both aspheric. Furthermore, the image-side surface 622 of the second lens element 620 includes at least one inflection point.

The third lens element 630 with positive refractive power has an object-side surface 631 being concave and an image-side surface 632 being convex. The third lens element 630 is made of a plastic material, and has the object-side surface 631 and the image-side surface 632 being both aspheric. Furthermore, the object-side surface 631 of the third lens element 630 includes at least one inflection point.

The fourth lens element 640 with positive refractive power has an object-side surface 641 being convex and an image-side surface 642 being convex. The fourth lens element 640 is made of a plastic material, and has the object-side surface 641 and the image-side surface 642 being both aspheric.

The fifth lens element 650 with negative refractive power has an object-side surface 651 being concave and an image-side surface 652 being convex. The fifth lens element 650 is made of a plastic material, and has the object-side surface 651 and the image-side surface 652 being both aspheric.

The IR-cut filter 660 and the cover glass 670 are made of glass materials and located between the fifth lens element 650 and the image surface 680 in sequence, and will not affect the focal length of the imaging optical lens assembly.

The detailed optical data of the 6th embodiment are shown in TABLE 11 and the aspheric surface data are shown in TABLE 12 below.

TABLE 11

6th Embodiment
f = 2.98 mm, Fno = 2.15, HFOV = 70.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 265.513 | ASP | 0.892 | Plastic | 1.544 | 56.0 | −4.48 |
| 2 | | 2.410 | ASP | 2.043 | | | | |
| 3 | Lens 2 | −26.246 | ASP | 3.200 | Plastic | 1.639 | 23.5 | −297.84 |
| 4 | | −31.894 | ASP | 0.470 | | | | |
| 5 | Lens 3 | −60.848 | ASP | 1.018 | Plastic | 1.544 | 56.0 | 7.45 |
| 6 | | −3.822 | ASP | −0.297 | | | | |
| 7 | Ape. Stop | Plano | | 2.118 | | | | |
| 8 | Lens 4 | 4.228 | ASP | 3.315 | Plastic | 1.544 | 56.0 | 3.29 |
| 9 | | −2.250 | ASP | 0.121 | | | | |
| 10 | Lens 5 | −1.636 | ASP | 0.547 | Plastic | 1.639 | 23.5 | −4.14 |
| 11 | | −4.864 | ASP | 1.000 | | | | |
| 12 | IR-cut filter | Plano | | 0.300 | Glass | 1.517 | 64.2 | — |
| 13 | | Plano | | 1.000 | | | | |
| 14 | Cover glass | Plano | | 0.500 | Glass | 1.517 | 64.2 | — |
| 15 | | Plano | | 1.039 | | | | |
| 16 | Image | Plano | | — | | | | |

Reference wavelength is 587.6 nm (d-line).

TABLE 12

Aspheric Coefficients

| Surface # | 1 | 2 | 3 | 4 | 5 |
|---|---|---|---|---|---|
| k = | −1.0000E+00 | −9.1836E−01 | 3.8347E+01 | −7.9269E+01 | 9.9000E+01 |
| A4 = | 2.2088E−03 | 1.2597E−02 | −5.6443E−04 | 2.2529E−02 | 2.4837E−02 |
| A6 = | −1.6889E−04 | −3.5259E−04 | 3.6732E−04 | −9.0532E−04 | −3.0108E−03 |
| A8 = | 5.8802E−06 | 5.5656E−04 | −2.8821E−04 | −5.7969E−04 | −2.7971E−04 |
| A10 = | −6.8000E−08 | −5.6132E−05 | 4.1424E−06 | 1.3589E−04 | 1.1093E−04 |
| A12 = | −1.8707E−11 | 4.3259E−18 | | | |

| Surface # | 6 | 8 | 9 | 10 | 11 |
|---|---|---|---|---|---|
| k = | 4.1736E−01 | 1.4622E+00 | −5.4658E−01 | −7.2154E−01 | −1.0000E+00 |
| A4 = | 1.1782E−03 | −6.1491E−03 | 1.0499E−04 | 3.9123E−02 | 3.0532E−02 |
| A6 = | −1.6949E−04 | −5.5244E−04 | 3.6670E−03 | −4.0368E−03 | −5.0863E−03 |
| A8 = | −1.9268E−04 | 3.6965E−06 | −5.2793E−04 | 4.7049E−04 | 5.1338E−04 |
| A10 = | 5.0712E−05 | −2.1554E−05 | 3.2697E−05 | −6.0446E−06 | −2.1734E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 2.98 | (R7 + R8)/(R7 − R8) | 0.31 |
| Fno | 2.15 | f/f123 | 0.23 |
| HFOV (deg.) | 70.5 | \|f1/f4\| | 1.36 |
| FOV (deg.) | 141.0 | \|f4/f2\| + \|f4/f3\| + \|f4/f5\| | 1.25 |
| V2 | 23.5 | \|f/f1\| | 0.67 |
| T12/T23 | 4.35 | \|f/f2\| | 0.01 |
| T12/T34 | 1.12 | \|f/f3\| | 0.40 |
| CT2/CT3 | 3.14 | \|f/f4\| | 0.91 |
| Y11/ImgH | 1.36 | \|f/f5\| | 0.72 |
| (f/R5) + (f/R6) | −0.83 | | |

7th Embodiment

Figure 13:
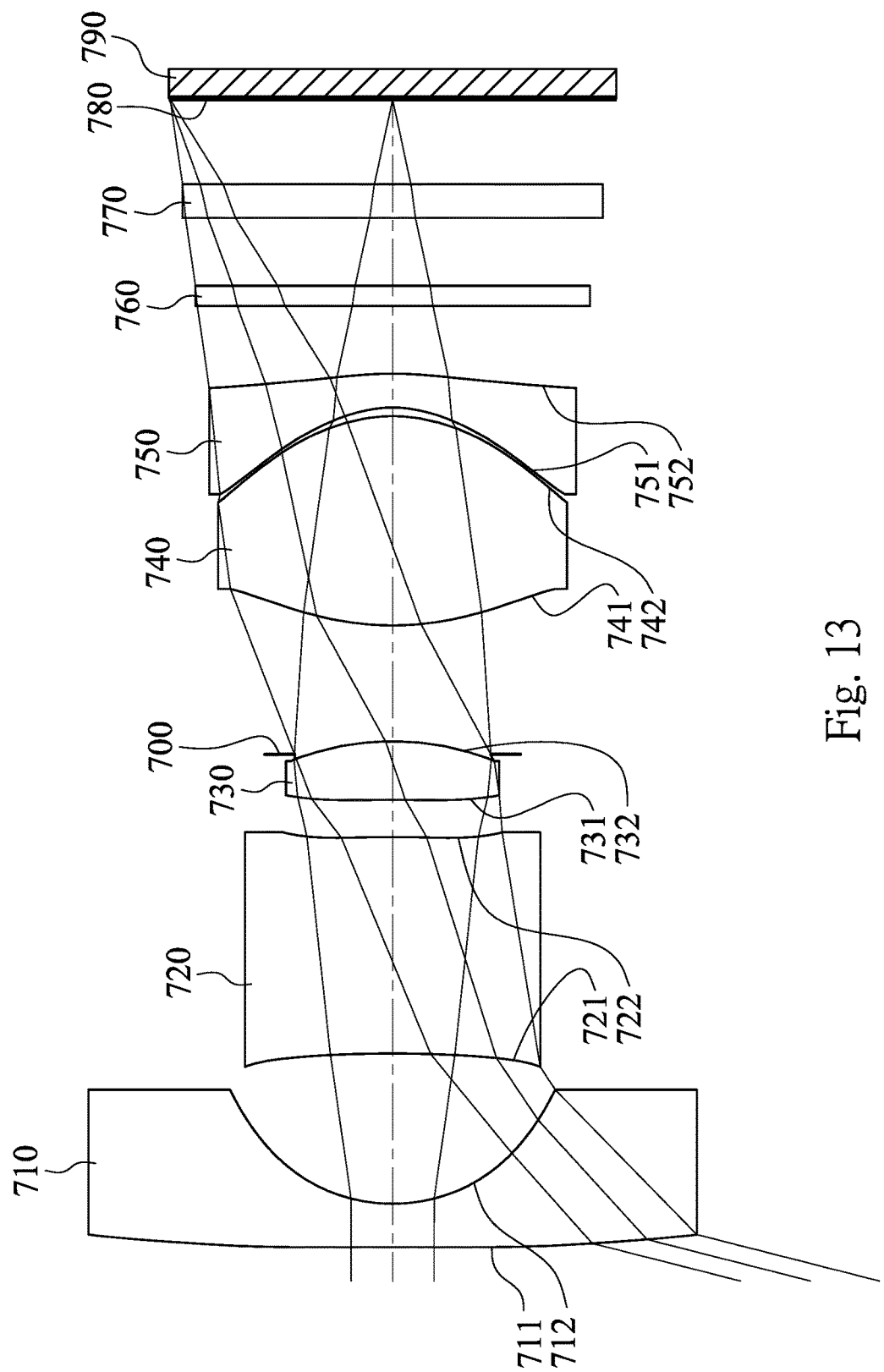
FIG. 13 is a schematic view of an image capturing apparatus according to the 7th embodiment of the present disclosure.
Figure 14:
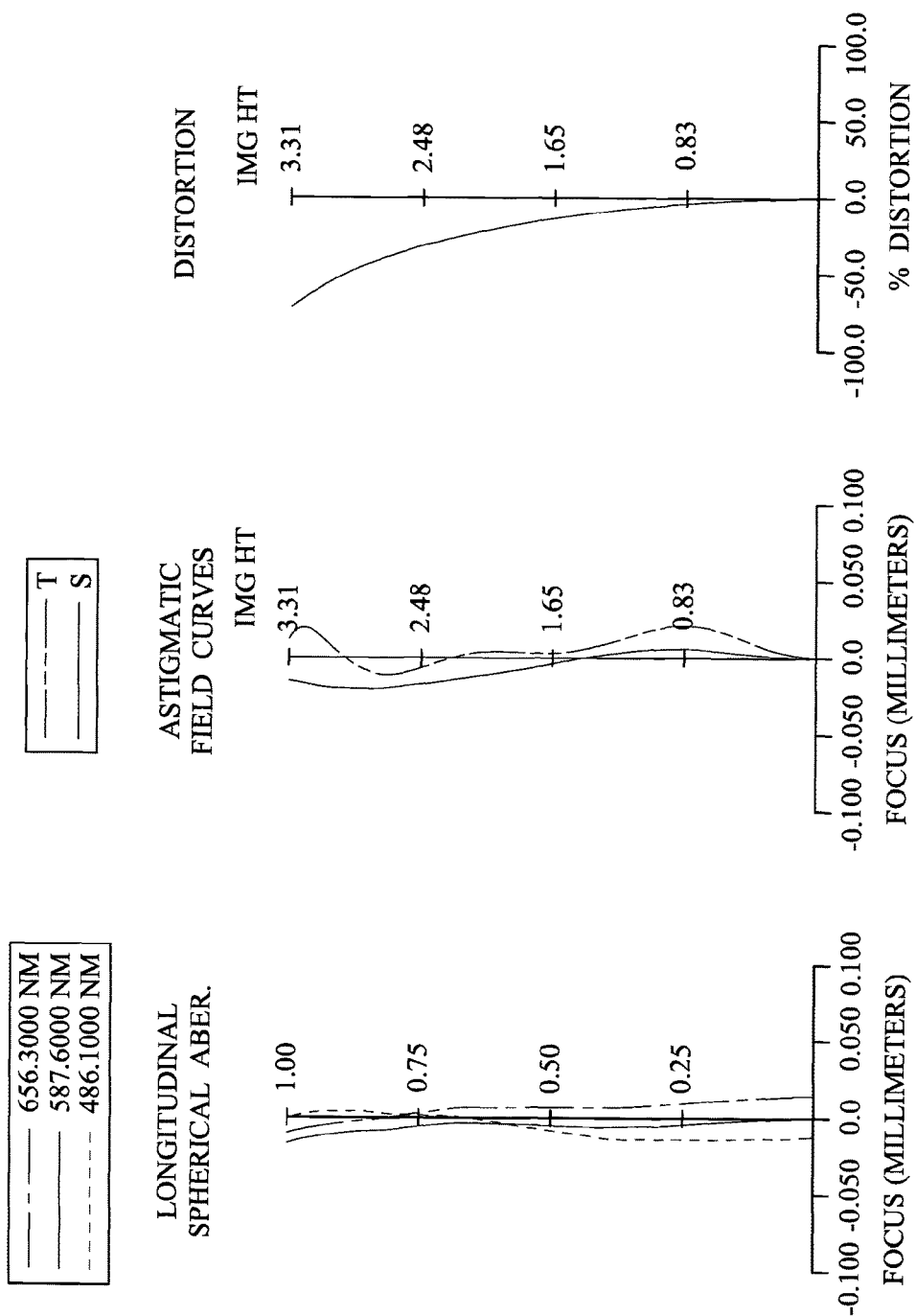
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment. In FIG. 13, the image capturing apparatus includes the imaging optical lens assembly (its reference numeral is omitted) and an image sensor 790. The imaging optical lens assembly includes, in order from an object side to an image side, a first lens element 710, a second lens element 720, a third lens element 730, an aperture stop 700, a fourth lens element 740, a fifth lens element 750, an IR-cut filter 160, a cover glass 770 and an image surface 780. The image sensor 790 is disposed on the image surface 780 of the imaging optical lens assembly. The imaging optical lens assembly has a total of five lens elements (710-750).

The first lens element 710 with negative refractive power has an object-side surface 711 being concave and an image-side surface 712 being concave. The first lens element 710 is made of a plastic material, and has the object-side surface 711 and the image-side surface 712 being both aspheric.

The second lens element 720 with positive refractive power has an object-side surface 721 being concave and an image-side surface 722 being convex. The second lens element 720 is made of a plastic material, and has the object-side surface 721 and the image-side surface 722 being both aspheric. Furthermore, the image-side surface 722 of the second lens element 720 includes at least one inflection point.

The third lens element 730 with positive refractive power has an object-side surface 731 being concave and an image-side surface 732 being convex. The third lens element 730 is made of a plastic material, and has the object-side surface 731 and the image-side surface 732 being both aspheric. Furthermore, the object-side surface 731 of the third lens element 730 includes at least one inflection point.

The fourth lens element 740 with positive refractive power has an object-side surface 741 being convex and an image-side surface 742 being convex. The fourth lens element 740 is made of a plastic material, and has the object-side surface 741 and the image-side surface 742 being both aspheric.

The fifth lens element 750 with negative refractive power has an object-side surface 751 being concave and an image-side surface 752 being convex. The fifth lens element 750 is made of a plastic material, and has the object-side surface 751 and the image-side surface 752 being both aspheric.

The IR-cut filter 760 and the cover glass 770 are made of glass materials and located between the fifth lens element 750 and the image surface 780 in sequence, and will not affect the focal length of the imaging optical lens assembly.

The detailed optical data of the 7th embodiment are shown in TABLE 13 and the aspheric surface data are shown in TABLE 14 below.

TABLE 13

7th Embodiment
f = 2.94 mm, Fno = 2.40, HFOV = 75.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −114.479 | ASP | 0.642 | Plastic | 1.544 | 56.0 | −4.53 |
| 2 | | 2.521 | ASP | 2.220 | | | | |
| 3 | Lens 2 | −20.391 | ASP | 3.200 | Plastic | 1.607 | 26.6 | 192.88 |
| 4 | | −18.397 | ASP | 0.546 | | | | |
| 5 | Lens 3 | −60.848 | ASP | 0.868 | Plastic | 1.544 | 56.0 | 8.39 |
| 6 | | −4.268 | ASP | −0.192 | | | | |
| 7 | Ape. Stop | Plano | | 1.904 | | | | |
| 8 | Lens 4 | 4.177 | ASP | 3.094 | Plastic | 1.544 | 56.0 | 3.41 |
| 9 | | −2.461 | ASP | 0.127 | | | | |
| 10 | Lens 5 | −1.875 | ASP | 0.500 | Plastic | 1.650 | 21.4 | −4.48 |
| 11 | | −5.809 | ASP | 1.000 | | | | |
| 12 | IR-cut filter | Plano | | 0.300 | Glass | 1.517 | 64.2 | — |
| 13 | | Plano | | 1.000 | | | | |
| 14 | Cover glass | Plano | | 0.500 | Glass | 1.517 | 64.2 | — |
| 15 | | Plano | | 1.269 | | | | |
| 16 | Image | Plano | | — | | | | |

Reference wavelength is 587.6 nm (d-line).

TABLE 14

| Aspheric Coefficients | | | | | |
|---|---|---|---|---|---|
| Surface # | 1 | 2 | 3 | 4 | 5 |
| k = | −1.0000E+00 | −7.0955E−01 | 1.7753E+01 | 3.3834E+01 | 9.9000E+01 |
| A4 = | 2.4287E−03 | 9.6538E−03 | −1.1056E−03 | 1.9291E−02 | 1.4446E−02 |
| A6 = | −1.8396E−04 | −6.5465E−04 | 4.4586E−04 | 7.0915E−04 | 1.4392E−03 |
| A8 = | 6.3597E−06 | 4.8495E−04 | −1.8231E−04 | −3.2362E−04 | −1.4226E−03 |
| A10 = | −7.6481E−08 | −4.3345E−05 | −1.1791E−06 | 1.4124E−04 | 4.1314E−04 |
| A12 = | −1.8707E−11 | 4.4430E−18 | | | |

| Surface # | 6 | 8 | 9 | 10 | 11 |
|---|---|---|---|---|---|
| k = | 7.7081E−01 | 1.3440E+00 | −4.5266E−01 | −6.0359E−01 | −8.7986E−02 |
| A4 = | −4.9645E−03 | −7.3244E−03 | 3.4734E−03 | 3.0261E−02 | 2.2336E−02 |
| A6 = | 2.7118E−03 | −3.3990E−04 | 1.3877E−03 | −3.6168E−03 | −3.8355E−03 |
| A8 = | −1.4375E−03 | 4.6931E−05 | −2.7835E−04 | 2.9862E−04 | 3.6214E−04 |
| A10 = | 3.6249E−04 | −2.1612E−05 | 2.7612E−05 | 1.5974E−05 | −1.3171E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 2.94 | (R7 + R8)/(R7 − R8) | 0.26 |
| Fno | 2.40 | f/f123 | 0.20 |
| HFOV (deg.) | 75.7 | |f1/f4| | 1.33 |
| FOV (deg.) | 151.4 | |f4/f2| + |f4/f3| + |f4/f5| | 1.19 |
| V2 | 26.6 | |f/f1| | 0.65 |
| T12/T23 | 4.07 | |f/f2| | 0.02 |
| T12/T34 | 1.30 | |f/f3| | 0.35 |
| CT2/CT3 | 3.69 | |f/f4| | 0.86 |
| Y11/ImgH | 1.36 | |f/f5| | 0.66 |
| (f/R5) + (f/R6) | −0.74 | | |

8th Embodiment

Figure 15:
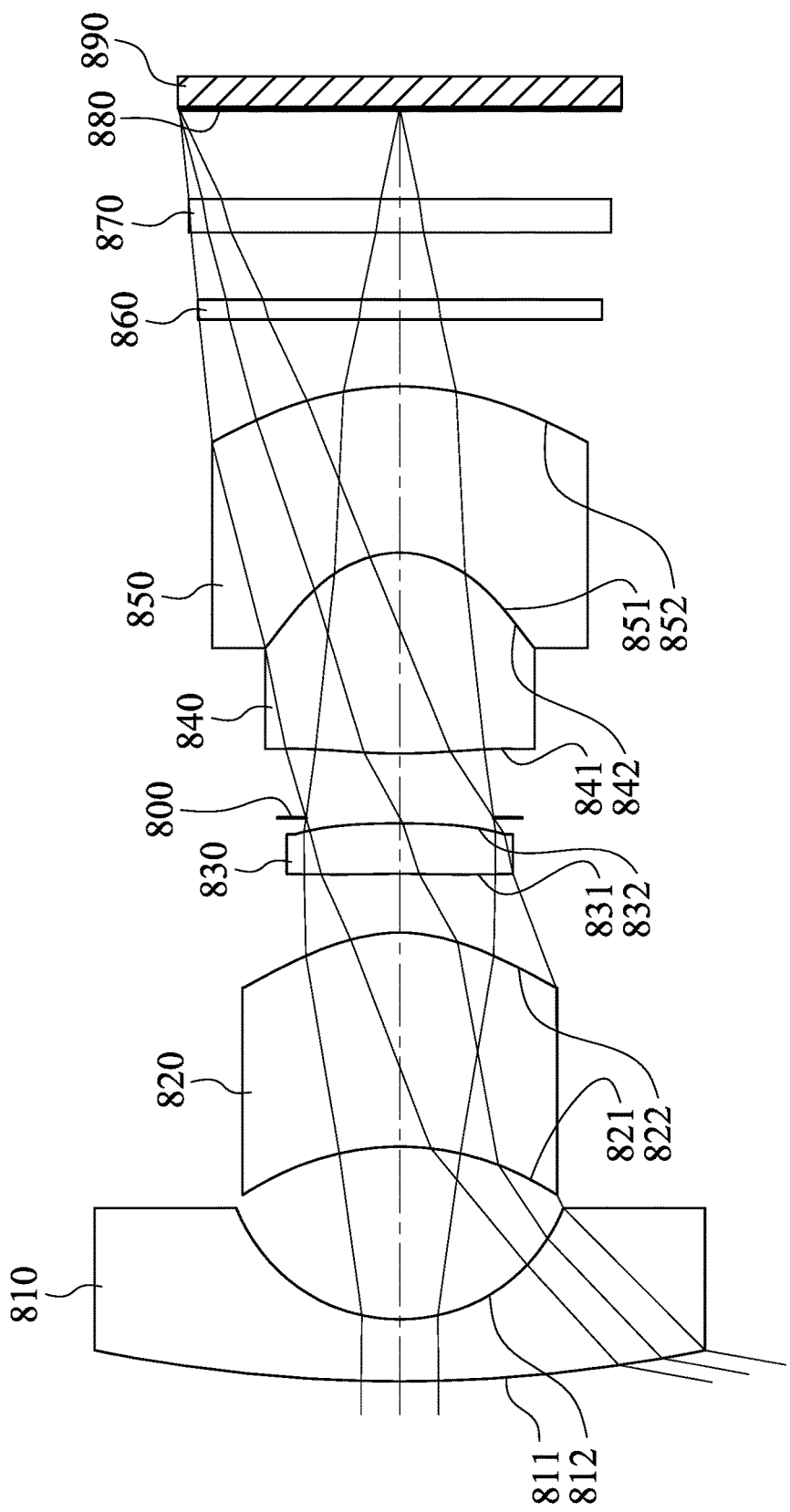
FIG. 15 is a schematic view of an image capturing apparatus according to the 8th embodiment of the present disclosure.
Figure 16:
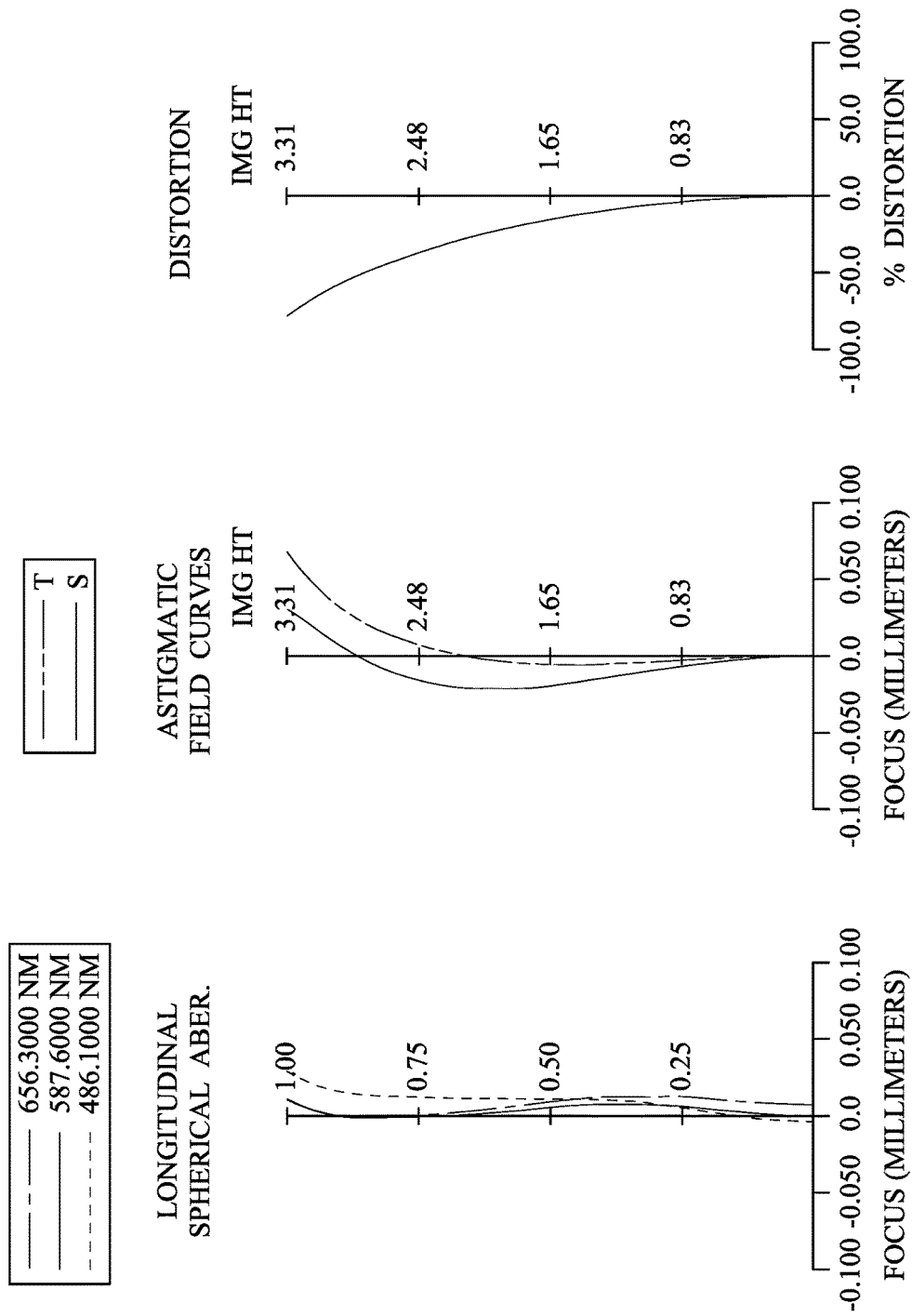
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows, in order from left to right, spherical aberration curves, astigmatic field curves and a distortion curve of the image capturing apparatus according to the 8th embodiment. In FIG. 15, the image capturing apparatus includes the imaging optical lens assembly (its reference numeral is omitted) and an image sensor 890. The imaging optical lens assembly includes, in order from an object side to an image side, a first lens element 810, a second lens element 820, a third lens element 830, an aperture stop 800, a fourth lens element 840, a fifth lens element 850, an IR-cut filter 860, a cover glass 870 and an image surface 880. The image sensor 890 is disposed on the image surface 880 of the imaging optical lens assembly. The imaging optical lens assembly has a total of five lens elements (810-850).

The first lens element 810 with negative refractive power has an object-side surface 811 being convex and an image-side surface 812 being concave. The first lens element 810 is made of a glass material, and has the object-side surface 811 and the image-side surface 812 being both spherical.

The second lens element 820 with positive refractive power has an object-side surface 821 being concave and an image-side surface 822 being convex. The second lens element 820 is made of a plastic material, and has the object-side surface 821 and the image-side surface 822 being both aspheric.

The third lens element 830 with positive refractive power has an object-side surface 831 being concave and an image-side surface 832 being convex. The third lens element 830 is made of a plastic material, and has the object-side surface 831 and the image-side surface 832 being both aspheric. Furthermore, the object-side surface 831 of the third lens element 830 includes at least one inflection point.

The fourth lens element 840 with positive refractive power has an object-side surface 841 being convex and an image-side surface 842 being convex. The fourth lens element 840 is made of a plastic material, and has the object-side surface 841 and the image-side surface 842 being both aspheric.

The fifth lens element 850 with negative refractive power has an object-side surface 851 being concave and an image-side surface 852 being convex. The fifth lens element 850 is made of a plastic material, and has the object-side surface 851 and the image-side surface 852 being both aspheric. The object-side surface 851 of the fifth lens element 850 and the image-side surface 842 of the fourth lens element 840 are cemented.

The IR-cut filter 860 and the cover glass 870 are made of glass materials and located between the fifth lens element 850 and the image surface 880 in sequence, and will not affect the focal length of the imaging optical lens assembly.

The detailed optical data of the 8th embodiment are shown in TABLE 15 and the aspheric surface data are shown in TABLE 16 below.

TABLE 15

8th Embodiment
f = 2.77 mm, Fno = 2.40, HFOV = 79.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 22.665 | | 0.920 | Glass | 1.691 | 54.7 | −4.37 |
| 2 | | 2.621 | | 2.580 | | | | |
| 3 | Lens 2 | −4.280 | ASP | 3.200 | Plastic | 1.564 | 36.4 | 6.22 |
| 4 | | −2.447 | ASP | 0.876 | | | | |
| 5 | Lens 3 | −13.445 | ASP | 0.754 | Plastic | 1.550 | 42.4 | 129.76 |
| 6 | | −11.539 | ASP | 0.081 | | | | |
| 7 | Ape. Stop | Plano | | 0.961 | | | | |
| 8 | Lens 4 | 8.935 | ASP | 3.000 | Plastic | 1.544 | 55.9 | 2.76 |
| 9 | Lens 5 | −1.595 | ASP | 2.483 | Plastic | 1.661 | 20.4 | −5.50 |
| 10 | | −4.601 | ASP | 1.000 | | | | |
| 11 | IR-cut filter | Plano | | 0.300 | Glass | 1.517 | 64.2 | — |
| 12 | | Plano | | 1.000 | | | | |
| 13 | Cover glass | Plano | | 0.500 | Glass | 1.517 | 64.2 | — |
| 14 | | Plano | | 1.345 | | | | |
| 15 | Image | Plano | | — | | | | |

Reference wavelength is 587.6 nm (d-line).

TABLE 16

Aspheric Coefficients

| Surface # | 3 | 4 | 5 | 6 |
|---|---|---|---|---|
| k = | −2.9067E+00 | −3.8612E+00 | −1.0000E+00 | −1.0000E+00 |
| A4 = | −7.6119E−03 | −4.7067E−03 | 3.2822E−02 | −3.6424E−03 |
| A6 = | 3.8865E−04 | 6.9100E−04 | −1.1376E−02 | −3.7993E−03 |
| A8 = | 5.0878E−05 | −4.1142E−05 | 2.5716E−03 | 9.3628E−04 |
| A10 = | −6.2972E−06 | 1.4761E−06 | −3.7040E−04 | −1.6201E−04 |

| Surface # | 8 | 9 | 10 |
|---|---|---|---|
| k = | −1.5804E+01 | −7.1928E−01 | −3.7607E−01 |
| A4 = | −7.7643E−03 | −1.0359E−02 | 7.0949E−05 |
| A6 = | −3.0492E−04 | 2.3742E−03 | 1.4689E−04 |
| A8 = | 4.2796E−05 | −8.2397E−04 | −7.8029E−06 |
| A10 = | −2.5766E−05 | 2.3848E−04 | 1.0340E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 2.77 | (R7 + R8)/(R7 − R8) | 0.70 |
| Fno | 2.40 | f/f123 | 0.41 |
| HFOV (deg.) | 79.7 | |f1/f4| | 1.58 |
| FOV (deg.) | 159.4 | |f4/f2| + |f4/f3| + |f4/f5| | 0.97 |
| V2 | 36.4 | |f/f1| | 0.63 |
| T12/T23 | 2.95 | |f/f2| | 0.45 |
| T12/T34 | 2.48 | |f/f3| | 0.02 |
| CT2/CT3 | 4.24 | |f/f4| | 1.00 |
| Y11/ImgH | 1.38 | |f/f5| | 0.50 |
| (f/R5) + (f/R6) | −0.45 | | |

9th Embodiment

Figure 17:
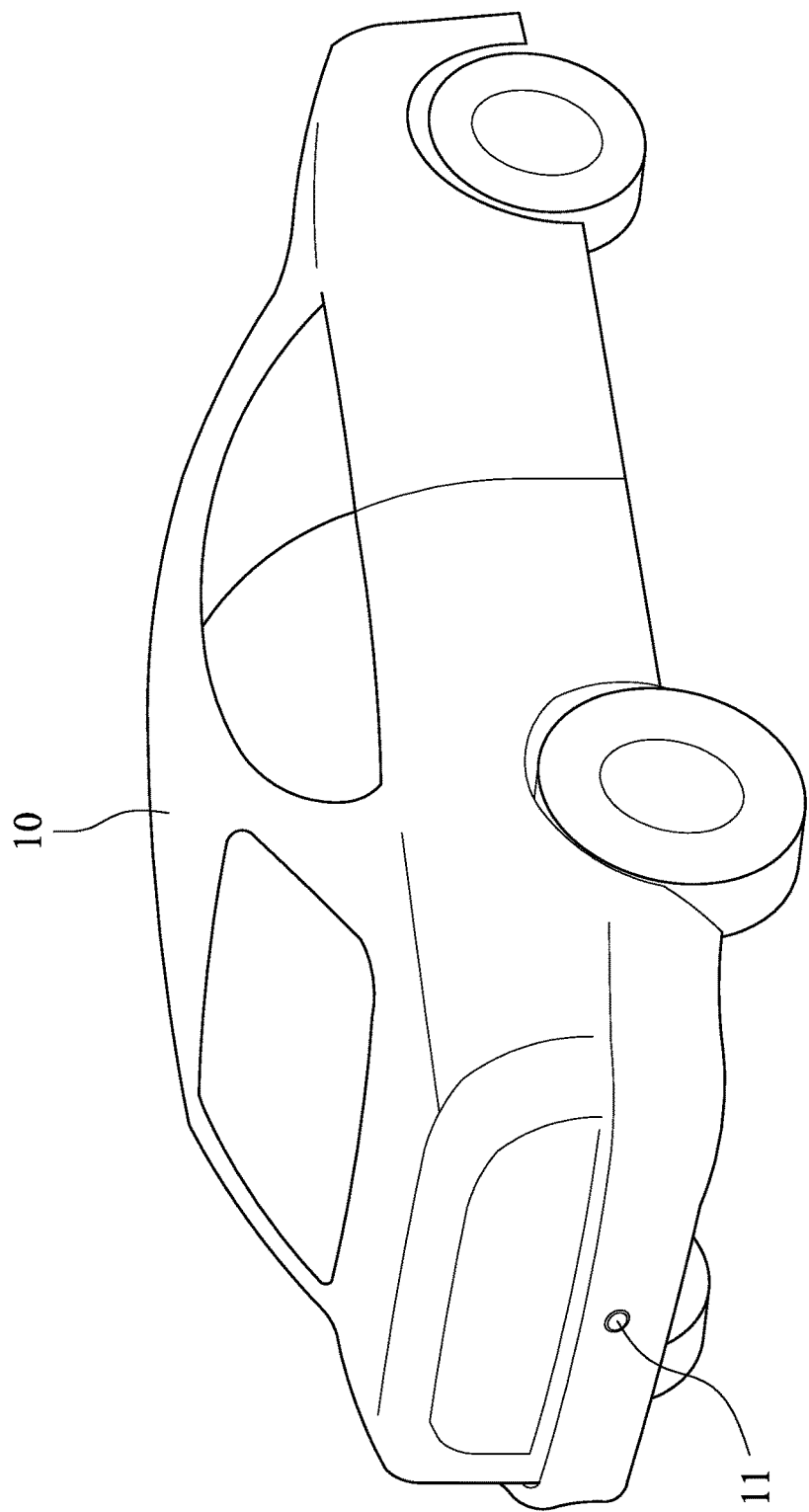
FIG. 17 shows an electronic device according to the 9th embodiment of the present disclosure.

FIG. 17 shows an electronic device 10 according to the 9th embodiment of the present disclosure. The electronic device 10 of the 9th embodiment is a rear view camera system, wherein the electronic device 10 includes an image capturing apparatus 11. The image capturing apparatus 11 includes an imaging optical lens assembly (not shown herein) according to the present disclosure and an image sensor (not shown herein), wherein the image sensor is disposed on an image surface of the imaging optical lens assembly.

10th Embodiment

Figure 18:
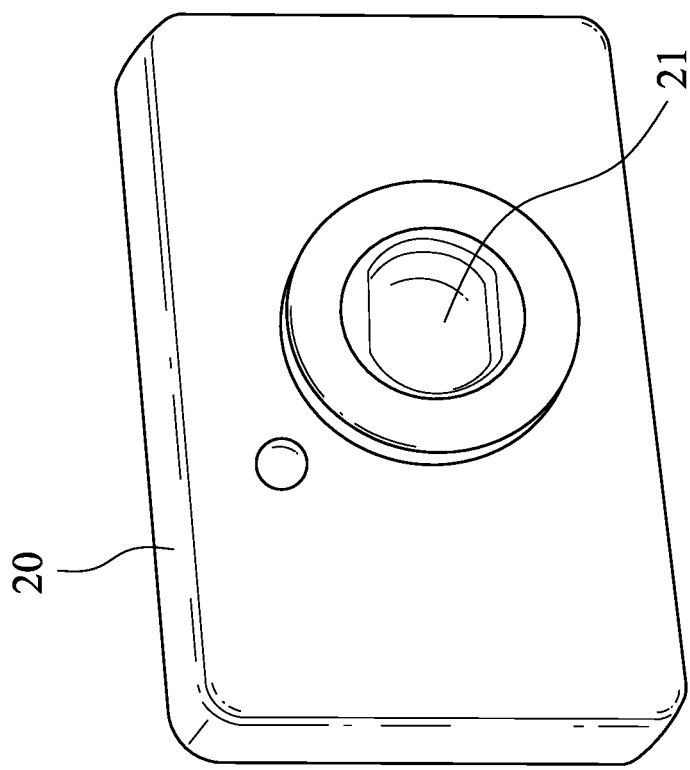
FIG. 18 shows an electronic device according to the 10th embodiment of the present disclosure.

FIG. 18 shows an electronic device 20 according to the 10th embodiment of the present disclosure. The electronic device 20 of the 10th embodiment is a driving recorder, wherein the electronic device 20 includes an image capturing apparatus 21. The image capturing apparatus 21 includes an imaging optical lens assembly (not shown herein) according to the present disclosure and an image sensor (not shown herein), wherein the image sensor is disposed on an image surface of the imaging optical lens assembly.

11th Embodiment

FIG. 19 shows an electronic device 30 according to the 11th embodiment of the present disclosure. The electronic device 30 of the 11th embodiment is a surveillance device, wherein the electronic device 30 includes an image capturing apparatus 31. The image capturing apparatus 31 includes an imaging optical lens assembly (not shown herein) according to the present disclosure and an image sensor (not shown herein), wherein the image sensor is disposed on an image surface of the imaging optical lens assembly.

The foregoing description, for purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens assembly comprising, in order from an object side to an image side:
    a first lens element with negative refractive power having an image-side surface being concave;
    a second lens element having an object-side surface being concave and an image-side surface being convex, wherein the second lens element is made of a plastic material, and both of the object-side surface and the image-side surface of the second lens element are aspheric;
    a third lens element having an object-side surface being concave and an image-side surface being convex, wherein the third lens element is made of a plastic material, and both of the object-side surface and the image-side surface of the third lens element are aspheric;
    a fourth lens element with positive refractive power having an image-side surface being convex; and
    a fifth lens element with negative refractive power having an object-side surface being concave;
    wherein the imaging optical lens assembly has a total of five lens elements, a central thickness of the second lens element is CT2, a central thickness of the third lens element is CT3, a focal length of the first lens element is f1, a focal length of the fourth lens element is f4, an axial distance between the first lens element and the second lens element is T12, an axial distance between the third lens element and the fourth lens element is T34, and the following conditions are satisfied:
    1.20<CT2/CT3;
    |f1/f4|<10.0; and
    T12/T34<3.50.

2. The imaging optical lens assembly of claim 1, wherein the fourth lens element has an object-side surface being convex.

3. The imaging optical lens assembly of claim 1, wherein the axial distance between the first lens element and the second lens element is T12, the axial distance between the third lens element and the fourth lens element is T34, and the following condition is satisfied:
    0.30<T12/T34<2.0.

4. The imaging optical lens assembly of claim 1, wherein the focal length of the first lens element is f1, the focal length of the fourth lens element is f4, and the following condition is satisfied:
    |f1/f4|<2.50.

5. The imaging optical lens assembly of claim 1, wherein the central thickness of the second lens element is CT2, the central thickness of the third lens element is CT3, and the following condition is satisfied:
    2.0<CT2/CT3<8.0.

6. The imaging optical lens assembly of claim 5, wherein the central thickness of the second lens element is CT2, the central thickness of the third lens element is CT3, and the following condition is satisfied:
    2.40<CT2/CT3<5.0.

7. The imaging optical lens assembly of claim 1, wherein the axial distance between the first lens element and the second lens element is T12, an axial distance between the second lens element and the third lens element is T23, and the following condition is satisfied:
    1.25<T12/T23<5.0.

8. The imaging optical lens assembly of claim 1, wherein a maximal effective radius of an object-side surface of the first lens element is Y11, a maximal image height of the imaging optical lens assembly is ImgH, and the following condition is satisfied:
    0.90<Y11/ImgH<1.60.

9. The imaging optical lens assembly of claim 1, wherein a focal length of the second lens element is f2, a focal length of the third lens element is f3, the focal length of the fourth lens element is f4, a focal length of the fifth lens element is f5, and the following condition is satisfied:
    0.60<|f4/f2|+|f4/f3|+|f4/f5|<1.50.

10. The imaging optical lens assembly of claim 1, wherein an Abbe number of the second lens element is V2, and the following condition is satisfied:
    V2<30.

11. The imaging optical lens assembly of claim 10, further comprising:
    an aperture stop disposed between the third lens element and the fourth lens element.

12. The imaging optical lens assembly of claim 10, wherein a maximal field of view of the imaging optical lens assembly is FOV, a focal length of the imaging optical lens assembly is f, the focal length of the first lens element is f1, a focal length of the second lens element is f2, a focal length of the third lens element is f3, the focal length of the fourth lens element is f4, a focal length of the fifth lens element is f5, and the following conditions are satisfied:
    100 degrees <FOV;
    |f/f1|<1.25;
    |f/f2|<1.25;
    |f/f3|<1.25;
    |f/f4|<1.25; and
    |f/f5|<1.25.

13. The imaging optical lens assembly of claim 1, wherein the fifth lens element has an image-side surface being convex.

14. The imaging optical lens assembly of claim 1, wherein a curvature radius of an object-side surface of the fourth lens element is R7, a curvature radius of the image-side surface of the fourth lens element is R8, and the following condition is satisfied:
    0.0<(R7+R8)/(R7−R8)<1.0.

15. The imaging optical lens assembly of claim 1, wherein the first lens element is made of a glass material.

16. The imaging optical lens assembly of claim 1, wherein a focal length of the imaging optical lens assembly is f, a composite focal length of the first lens element, the second lens element and the third lens element is f123, and the following condition is satisfied:

0<f/f123.

17. The imaging optical lens assembly of claim 1, wherein a focal length of the imaging optical lens assembly is f, a curvature radius of the object-side surface of the third lens element is R5, a curvature radius of the image-side surface of the third lens element is R6, and the following condition is satisfied:

−1.5<(f/R5)+(f/R6)<−0.60.

18. The imaging optical lens assembly of claim 1, wherein at least one of the second lens element and the third lens element comprises at least one inflection point.

19. An image capturing apparatus, comprising:
the imaging optical lens assembly of claim 1; and
an image sensor, wherein the image sensor is disposed on an image surface of the imaging optical lens assembly.

20. An electronic device, comprising:
the image capturing apparatus of claim 19.

* * * * *